United States Patent
Gaudin et al.

(10) Patent No.: US 12,400,274 B2
(45) Date of Patent: *Aug. 26, 2025

(54) SYSTEMS AND METHODS FOR ANALYZING PROPERTY TELEMATICS DATA TO UPDATE RISK-BASED COVERAGE OF A PROPERTY

(71) Applicant: State Farm Mutual Automobile Insurance Company, Bloomington, IL (US)

(72) Inventors: Kristopher Keith Gaudin, Bloomington, IL (US); Tracey Dunne, Normal, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/653,464

(22) Filed: May 2, 2024

(65) Prior Publication Data

US 2024/0281898 A1 Aug. 22, 2024

Related U.S. Application Data

(63) Continuation of application No. 18/160,545, filed on Jan. 27, 2023, now Pat. No. 12,020,332, which is a (Continued)

(51) Int. Cl.
*G06Q 40/08* (2012.01)
*G06Q 30/0645* (2023.01)

(52) U.S. Cl.
CPC ......... *G06Q 40/08* (2013.01); *G06Q 30/0645* (2013.01)

(58) Field of Classification Search
None
See application file for complete search history.

(56) References Cited

U.S. PATENT DOCUMENTS

| | | | |
|---|---|---|---|
| 6,909,921 | B1 | 6/2005 | Bilger |
| 8,046,243 | B2 | 10/2011 | Winkler |

(Continued)

FOREIGN PATENT DOCUMENTS

| | | | |
|---|---|---|---|
| AU | 2015100551 A4 | 5/2015 | |
| EP | 3239686 A1 | 11/2017 | |

(Continued)

OTHER PUBLICATIONS

Meleo L.,Romolini A.,DeMarco M. (2016) The Sharing Economy Revolution and Peer-to-peer Online Platforms. The Case of Airbnb .In: Borangiu T., Dragoicea M.,Névoa H.(eds) Exploring Services Science. IESS 2016. Lecture Notes in Business Information Processing, vol. 247. Springer, pp. 561-570. (Year: 2016).*

(Continued)

*Primary Examiner* — Mohammad Z Shaikh
(74) *Attorney, Agent, or Firm* — Armstrong Teasdale LLP

(57) ABSTRACT

Systems and methods may analyze property telematics data, with homeowner permission or affirmative consent, to update risk-based coverage of a property, such as a house, during a short-term rental. The systems include a renter analytics computing device, a plurality of property telematics devices at the property, including at least one sensor, and a property telematics controller. The renter analytics computing device is configured to retrieve a pre-rental record including parameters of a short-term rental of the property, and retrieve property telematics data, from the property telematics devices, associated with the short-term rental. The renter analytics computing device may develop a risk level profile associated with the short-term rental and determine an adjusted coverage rate to cover the property during (Continued)

the short-term rental. As a result, a homeowner of the property may be protected against damages incurred to the property during the short-term rental.

20 Claims, 8 Drawing Sheets

Related U.S. Application Data continuation of application No. 16/667,529, filed on Oct. 29, 2019, now Pat. No. 11,593,887, which is a continuation of application No. 15/440,854, filed on Feb. 23, 2017, now Pat. No. 10,504,189.

(60) Provisional application No. 62/353,929, filed on Jun. 23, 2016.

(56) References Cited

U.S. PATENT DOCUMENTS

| | | | |
|---|---|---|---|
| 8,433,344 B1 | 4/2013 | Virga | |
| 8,712,805 B1 | 4/2014 | Ferries et al. | |
| 8,799,029 B2 | 8/2014 | Bodas | |
| 9,311,676 B2* | 4/2016 | Helitzer | G16Z 99/00 |
| 9,710,858 B1* | 7/2017 | Devereaux | G06Q 50/16 |
| 9,811,862 B1* | 11/2017 | Allen | G06Q 10/20 |
| 9,830,748 B2 | 11/2017 | Rosenbaum | |
| 9,990,782 B2 | 6/2018 | Rosenbaum | |
| 10,055,793 B1 | 8/2018 | Call et al. | |
| 10,062,118 B1 | 8/2018 | Bernstein et al. | |
| 10,223,751 B1* | 3/2019 | Hutchinson | G06Q 40/08 |
| 10,229,394 B1 | 3/2019 | Davis et al. | |
| 10,269,190 B2 | 4/2019 | Rosenbaum | |
| 10,296,978 B1 | 5/2019 | Corder et al. | |
| 10,453,149 B1* | 10/2019 | Gaudin | G06Q 40/08 |
| 10,467,824 B2 | 11/2019 | Rosenbaum | |
| 10,504,189 B1* | 12/2019 | Gaudin | G06Q 40/08 |
| 10,623,509 B2 | 4/2020 | Delinselle et al. | |
| 10,672,081 B1 | 6/2020 | Lyons et al. | |
| 10,685,402 B1* | 6/2020 | Bryant | G06Q 50/163 |
| 10,699,346 B1* | 6/2020 | Corder | G06Q 40/08 |
| 10,726,494 B1 | 7/2020 | Shah et al. | |
| 10,740,847 B1 | 8/2020 | Devereaux et al. | |
| 10,861,115 B1 | 12/2020 | Stricker et al. | |
| 10,943,306 B1 | 3/2021 | Gaudin et al. | |
| 11,003,334 B1 | 5/2021 | Conway et al. | |
| 11,037,255 B1 | 6/2021 | Ganev et al. | |
| 11,055,797 B1 | 7/2021 | Carone | |
| 11,062,398 B1* | 7/2021 | Gaudin | G06Q 30/0645 |
| 11,087,347 B1 | 8/2021 | De Guia et al. | |
| 11,087,420 B1 | 8/2021 | Trundle | |
| 11,210,741 B1 | 12/2021 | Allen et al. | |
| 11,227,452 B2 | 1/2022 | Rosenbaum | |
| 11,407,410 B2 | 8/2022 | Rosenbaum | |
| 11,501,100 B1 | 11/2022 | Geng et al. | |
| 11,524,707 B2 | 12/2022 | Rosenbaum | |
| 11,593,887 B1* | 2/2023 | Gaudin | G06Q 40/08 |
| 11,594,083 B1 | 2/2023 | Rosenbaum | |
| 11,656,097 B2 | 5/2023 | Vega et al. | |
| 11,748,817 B2 | 9/2023 | Szott | |
| 12,020,332 B2* | 6/2024 | Gaudin | G06Q 40/08 |
| 2002/0010601 A1* | 1/2002 | Taylor | G06Q 10/10 705/4 |
| 2005/0055249 A1 | 3/2005 | Helitzer et al. | |
| 2006/0116915 A1 | 6/2006 | Colessides et al. | |
| 2006/0261962 A1* | 11/2006 | Berenguer | G08B 21/0423 340/573.1 |
| 2007/0265902 A1 | 11/2007 | Brennen et al. | |
| 2008/0065427 A1* | 3/2008 | Helitzer | G16Z 99/00 705/4 |
| 2008/0189142 A1* | 8/2008 | Brown | G06Q 10/00 705/325 |
| 2008/0255862 A1 | 10/2008 | Bailey et al. | |
| 2009/0261943 A1 | 10/2009 | Jana et al. | |
| 2011/0270773 A1 | 11/2011 | Siekman et al. | |
| 2011/0295624 A1 | 12/2011 | Chapin et al. | |
| 2012/0030000 A1* | 2/2012 | Hanini | G06Q 30/00 705/14.31 |
| 2012/0072239 A1 | 3/2012 | Gibbard et al. | |
| 2012/0116820 A1* | 5/2012 | English | G06Q 40/08 705/4 |
| 2013/0096954 A1* | 4/2013 | Bodas | G06Q 40/08 705/4 |
| 2014/0136242 A1* | 5/2014 | Weekes | G06Q 40/08 705/4 |
| 2014/0257876 A1* | 9/2014 | English | G06Q 40/08 705/4 |
| 2014/0278578 A1* | 9/2014 | Cantwell | G06Q 40/08 705/4 |
| 2014/0358592 A1* | 12/2014 | Wedig | G06Q 40/08 705/4 |
| 2015/0039466 A1* | 2/2015 | Skinner | G06Q 30/0609 705/26.35 |
| 2015/0061859 A1 | 3/2015 | Matsuoka et al. | |
| 2015/0154716 A1 | 6/2015 | Ford et al. | |
| 2015/0161719 A1 | 6/2015 | Abhyanker | |
| 2015/0227992 A1* | 8/2015 | Wong | G06Q 30/0283 702/187 |
| 2015/0235333 A1* | 8/2015 | Bangerter | G06Q 30/0645 705/314 |
| 2015/0310720 A1* | 10/2015 | Gettings | G06F 16/113 340/540 |
| 2015/0317400 A1 | 11/2015 | Charkov et al. | |
| 2015/0370272 A1* | 12/2015 | Reddy | F24F 11/65 700/278 |
| 2016/0005130 A1* | 1/2016 | Devereaux | G06Q 40/12 705/4 |
| 2016/0025240 A1* | 1/2016 | Du | F16L 1/20 405/184.4 |
| 2016/0048934 A1 | 2/2016 | Gross | |
| 2016/0055594 A1 | 2/2016 | Emison et al. | |
| 2016/0155110 A1* | 6/2016 | Wright | G06Q 20/223 705/4 |
| 2016/0163138 A1* | 6/2016 | Turner | G07C 9/00896 340/5.7 |
| 2016/0261931 A1* | 9/2016 | Fadell | G08C 17/02 |
| 2016/0275633 A1 | 9/2016 | Gitt et al. | |
| 2016/0321587 A1 | 11/2016 | Gitt et al. | |
| 2018/0033087 A1 | 2/2018 | Delinselle et al. | |
| 2019/0251520 A1 | 8/2019 | Bentley, III et al. | |
| 2021/0011448 A1 | 1/2021 | Coleman et al. | |
| 2021/0018335 A1 | 1/2021 | Hood | |
| 2021/0019847 A1 | 1/2021 | Sneed | |
| 2021/0150651 A1 | 5/2021 | Shoup | |
| 2021/0182986 A1 | 6/2021 | Butler et al. | |
| 2021/0279791 A1 | 9/2021 | Jacoby | |
| 2021/0350471 A1 | 11/2021 | Hakimi-Boushehri et al. | |
| 2022/0092893 A1 | 3/2022 | Rosenbaum | |
| 2022/0340148 A1 | 10/2022 | Rosenbaum | |
| 2022/0343443 A1 | 10/2022 | Graham et al. | |
| 2022/0391794 A1 | 12/2022 | Singh et al. | |
| 2023/0035517 A1 | 2/2023 | Bentley, III et al. | |
| 2023/0060300 A1 | 3/2023 | Rosenbaum | |

FOREIGN PATENT DOCUMENTS

| | | |
|---|---|---|
| EP | 3578433 B1 | 8/2020 |
| EP | 3730375 B1 | 10/2021 |
| EP | 3960576 A1 | 3/2022 |
| EP | 4190659 A1 | 6/2023 |
| EP | 4190660 A1 | 6/2023 |
| WO | 2018052595 A1 | 3/2018 |

OTHER PUBLICATIONS

Cross, Miriam, "Share your home fun and profit", Kiplinger's Personal Finance, May 2016, pp. 1-6. (Year: 2016).*

Airbnb Help: Hosting, accessed from: https://web.archive.org/web/20121012162228/https://www.airbnb.com/help/topic/hosting.

(56) References Cited

OTHER PUBLICATIONS

Cross, Miriam, "Share your home for fun and profit", Kiplinger's Personal Finance, May 2016, pp. 1-6. (Year: 2016).

Meleo et al., "The Sharing Economy Revolution and Peer-to-peer Online Platforms. The Case of Airbnb". In: Borangiu et al., (eds) Exploring Services Science. IESS 2016. Lecture Notes in Business Information Processing, vol. 247. Springer, pp. 561-570.

Zekanović-Korona, "Evolution of Shared Digital Economy Adoption: Case of AirBnb", MIPRO 2014, May 26-30, 2014, pp. 1574-1579 (Year: 2014).

Liu et al., "Design and Implementation of Smart-Home Monitoring System with the Internet of Things Technology," p. 5, Jan. 2016. Retrieved from: https://www.researchgate.net/publication/300330870_Design_and_Implementation_of_Smart-Home_Monitoring_System_with_the_Internet_of_Things_Technology.

Michalis et al., "Quality Evaluation of Residential Houses: The Development of a Real-Time Quality Assessment Tool," p. 11-12, Jan. 2013. Retrieved from: https://www.researchgate.net/publication/233841366_Quality_Evaluation_of_Residential_Houses_The_Development_of_a_Real-Time_Quality_Assessment_Tool.

Moore et al., "An intelligent maintenance system for continuous cost-based prioritisation of maintenance activities," Aug. 2006. Retrieved from: https://www.researchgate.net/publication/222428855_An_intelligent_maintenance_system_for_continuous_cost-based_prioritisation_of_maintenance_activities.

Spoor et al., "How can data generated by smart home devices help identify consumer needs?," p. 7, Jul. 2016. Retrieved from: https://essay.utwente.nl/69990/1/Spoor_BA_BMS.pdf.

\* cited by examiner

SYSTEMS AND METHODS FOR ANALYZING PROPERTY TELEMATICS DATA TO UPDATE RISK-BASED COVERAGE OF A PROPERTY

CROSS-REFERENCE TO RELATED APPLICATIONS

This application is a continuation of and claims priority to U.S. patent application Ser. No. 18/160,545, entitled "SYSTEMS AND METHODS FOR ANALYZING PROPERTY TELEMATICS DATA TO UPDATE RISK-BASED COVERAGE OF A PROPERTY" filed Jan. 27, 2023, which is a continuation of and claims priority to U.S. patent application Ser. No. 16/667,529, entitled "SYSTEMS AND METHODS FOR ANALYZING PROPERTY TELEMATICS DATA TO UPDATE RISK-BASED COVERAGE OF A PROPERTY" filed Oct. 29, 2019, which is a continuation of and claims priority to U.S. patent application Ser. No. 15/440,854, entitled "SYSTEMS AND METHODS FOR ANALYZING PROPERTY TELEMATICS DATA TO UPDATE RISK-BASED COVERAGE OF A PROPERTY" filed Feb. 23, 2017, which claims the benefit of priority to U.S. Provisional Patent Application No. 62/353,929, filed Jun. 23, 2016, entitled "SYSTEMS AND METHODS FOR ANALYZING PROPERTY TELEMATICS DATA TO UPDATE RISK-BASED COVERAGE OF A PROPERTY," the contents of which are hereby incorporated by reference in their entireties and for all purposes.

FIELD OF THE DISCLOSURE

The present disclosure generally relates to property costs and, more particularly to systems and methods for analyzing property telematics data to update risk-based coverage—for example, updating a homeowner's insurance policy—of a property.

BACKGROUND

The home-sharing market is expanding rapidly. With services like AIR BNB® and Vacation Rentals By Owner (VRBO)®, among others, homeowners and long-term renters (e.g., renters with year-long leases) are increasingly offering their rooms, homes, condos, and/or apartments for use under short-term leases (e.g., days, weeks, months). However, many homeowner's insurance policies do not cover properties that are rented for more than six weeks out of a year, which may leave homeowners liable for damage to their property. Moreover, although some home-sharing platforms offer insurance to renters, such insurance may be optional and/or may not be sufficient to cover certain kinds of damages, which may also leave homeowners responsible for paying for damage incurred by renters.

BRIEF SUMMARY

The present embodiments may relate to systems and methods for analyzing property telematics data to update risk-based coverage, for example, updating a homeowner's insurance policy. A property-sharing system including a renter analytics computing device may retrieve and process property telematics data generated by a plurality of telematics devices at a property. The renter analytics computing device may then determine a number of renters present at the property for a period of time and may update and/or adjust an insurance policy (e.g., an insurance rate) associated with the property for the period of time.

In one aspect, a property-sharing system for leveraging property telematics data to update risk-based coverage of a property may be provided. The property sharing system may include a renter analytics computing device including a processor in communication with a memory, a plurality of property telematics devices physically located at the property, the plurality of property telematics devices including at least one sensor, and a property telematics controller in communication with the plurality of property telematics devices and the renter analytics computing device. The plurality of property telematics devices may be configured to generate property telematics data indicative of actual usage of the property during a short-term rental. The renter analytics computing device may be configured to retrieve a pre-rental record including parameters of a short-term rental of the property, the parameters including an anticipated number of renters, a start date, an end date, and an indicator of shared space, and transmit an instruction to the property telematics controller to transmit a subset of the property telematics data associated with a duration of the short-term rental to the renter analytics computing device. The property telematics controller may be configured to store the property telematics data generated by the plurality of property telematics device, and transmit the subset of the property telematics data to the renter analytics computing device. The renter analytics computing device may be further configured to develop a risk level profile associated with the short-term rental based upon the parameters of the short-term rental and the subset of the property telematics data, determine an adjusted coverage rate to cover the property for the duration of time based upon the risk level profile, and transmit a coverage report including the adjusted coverage rate to a homeowner associated with the property for review and approval of the adjusted coverage rate.

In another aspect, a renter analytics computing device for analyzing property telematics data to update risk-based coverage of a property may be provided. The renter analytics computing device may include a processor in communication with a memory. The processor may be programmed to retrieve insurance policy information associated with an insurance policy issued for the property, the insurance policy information including a baseline coverage rate. The processor may also be programmed to retrieve a pre-rental record including parameters of a short-term rental of the property, the parameters including an anticipated number of renters, a start date, an end date, and an indicator of shared space. The processor may be further programmed to retrieve property telematics data associated with a duration of time between the start date and the end date, wherein the property telematics data is generated by one or more property telematics devices associated with the property, the property telematics data indicative of actual usage of the property during the short-term rental. The processor may also be programmed to develop a risk level profile associated with the short-term rental based upon the parameters of the short-term rental and the property telematics data, and determine an adjusted coverage rate to cover the property for the duration of time based upon the risk level profile, the adjusted coverage rate independent of the baseline coverage rate. The processor may still further be programmed to transmit a coverage report including the adjusted coverage rate to a homeowner associated with the property for review and approval of the adjusted coverage rate. The processor may be programmed to perform additional, fewer, or alternative actions, including those discussed elsewhere herein.

In another aspect, a computer-implemented method for analyzing property telematics data to update risk-based coverage of a property, as well as improving the functionality of a computer or computer system, may be provided. The method may include (1) retrieving insurance policy information associated with an insurance policy issued for the property, the insurance policy information including a baseline coverage rate. The method may also include (2) retrieving a pre-rental record including parameters of a short-term rental of the property, the parameters including an anticipated number of renters, a start date, an end date, and an indicator of shared space. The method may further include (3) retrieving property telematics data associated with a duration of time between the start date and the end date, wherein the property telematics data is generated by one or more property telematics devices associated with the property, the property telematics data indicative of actual usage of the property during the short-term rental. The method may also include (4) developing a risk level profile associated with the short-term rental based upon the parameters of the short-term rental and the property telematics data, and determining an adjusted coverage rate to cover the property for the duration of time based upon the risk level profile, the adjusted coverage rate independent of the baseline coverage rate. The method may still further include (5) transmitting (such as via wireless communication or data transmission over one or more radio links or wireless communication channels) a coverage report including the adjusted coverage rate to a mobile device of a homeowner associated with the property for review and approval of the adjusted coverage rate. The method may include additional, fewer, or alternative actions, including those discussed elsewhere herein.

In yet another aspect, at least one non-transitory computer-readable storage media having computer-executable instructions embodied thereon may be provided. When executed by one or more processors on a renter analytics computing device, the computer-executable instructions may cause the one or more processors to retrieve insurance policy information associated with an insurance policy issued for the property, the insurance policy information including a baseline coverage rate. The computer-executable instructions may also cause the one or more processors to retrieve a pre-rental record including parameters of a short-term rental of the property, the parameters including an anticipated number of renters, a start date, an end date, and an indicator of shared space. The computer-executable instructions may further cause the one or more processors to retrieve property telematics data associated with a duration of time between the start date and the end date, wherein the property telematics data is generated by one or more property telematics devices associated with the property, the property telematics data indicative of actual usage of the property during the short-term rental. The computer-executable instructions may also cause the one or more processors to develop a risk level profile associated with the short-term rental based upon the parameters of the short-term rental and the property telematics data. The computer-executable instructions may still further cause the one or more processors to determine an adjusted coverage rate to cover the property for the duration of time based upon the risk level profile, the adjusted coverage rate independent of the baseline coverage rate, and transmit a coverage report including the adjusted coverage rate to a homeowner associated with the property for review and approval of the adjusted coverage rate. The computer-executable instructions may cause the one or more processors to perform additional, fewer, or alternative actions, including those discussed elsewhere herein.

In one aspect, a renter analytics computing device for updating risk-based coverage of a property for a short-term rental may be provided. The renter analytics computing device may be configured to retrieve a pre-rental record including parameters of a short-term rental of the property. The parameters may include an anticipated number of renters, a start date, an end date, and an indicator of shared space. The renter analytics computing device may also be configured to develop an initial risk level profile associated with the short-term rental based upon the parameters of the short-term rental, and implement, upon approval from a homeowner associated with the property, a preliminary adjusted coverage rate to cover the property for the duration of time based upon the initial risk level profile. The renter analytics computing device may be further configured to retrieve property telematics data associated with a duration of time between the start date and the end date, wherein the property telematics data is generated by one or more property telematics devices associated with the property. The property telematics data may be indicative of actual usage of the property during the short-term rental. The renter analytics computing device may be configured to update the initial risk level profile to an actual risk level profile based upon the property telematics data, and issue at least one of a credit and a debit to the homeowner based upon the actual risk level profile and the preliminary adjusted coverage rate.

In another aspect, a computer-implemented method for updating risk-based coverage of a property for a short-term rental, and/or improving the functioning of a computer, may be provided. The method may be implemented using a renter analytics computing device. The method may include (1) retrieving a pre-rental record including parameters of a short-term rental of the property, the parameters including an anticipated number of renters, a start date, an end date, and an indicator of shared space. The method may also include (2) developing an initial risk level profile associated with the short-term rental based upon the parameters of the short-term rental, and (3) implementing, upon approval from a homeowner associated with the property, a preliminary adjusted coverage rate to cover the property for the duration of time based upon the initial risk level profile. The method may further include (4) retrieving property telematics data associated with a duration of time between the start date and the end date, wherein the property telematics data is generated by one or more property telematics devices associated with the property. The property telematics data may be indicative of actual usage of the property during the short-term rental. The method may also include (5) updating the initial risk level profile to an actual risk level profile based upon the property telematics data, and/or (6) issuing at least one of a credit and a debit to the homeowner based upon the actual risk level profile and the preliminary adjusted coverage rate.

In a further aspect, a renter analytics computing device for analyzing property telematics data to update risk-based coverage of a property may be provided. The renter analytics computing device may be configured to retrieve insurance policy information associated with an insurance policy issued for the property, the insurance policy information including a baseline coverage rate. The renter analytics computing device may also be configured to, upon receiving a notification from a homeowner associated with the property that the property is available for short-term rentals, implement a preliminary adjusted coverage rate for a plurality of preliminary intervals. The renter analytics computing device may be further configured to retrieve a plurality of pre-rental records including parameters of a corresponding plurality of short-term rentals of the property during the plurality of preliminary intervals, and retrieve property telematics data associated with the plurality of short-term rentals, wherein the property telematics data is generated by one or more property telematics devices associated with the property. The property telematics data may be indicative of actual usage of the property during the plurality of short-term rentals. The renter analytics computing device may also be configured to develop an average risk level profile of the plurality of short-term rentals based upon the parameters of the plurality of short-term rentals and the property telematics data, the average risk level profile indicating an average level of risk presented by the plurality of short-term rentals. The renter analytics computing device may be still further configured to determine a long-term adjusted coverage rate based upon the average risk level profile, and transmit a coverage report including the long-term adjusted coverage rate to a homeowner associated with the property for review and approval of the long-term adjusted coverage rate In yet another aspect, a computer-implemented method for analyzing property telematics data to update risk-based coverage of a property, and/or improve the functioning of a computer, may be provided. The method may be implemented using a renter analytics computing device. The method may include (1) retrieving insurance policy information associated with an insurance policy issued for the property, the insurance policy information including a baseline coverage rate. The method may also include, (2) upon receiving a notification from a homeowner associated with the property that the property is available for short-term rentals, implementing a preliminary adjusted coverage rate for a plurality of preliminary intervals. The method may further include (3) retrieving a plurality of pre-rental records including parameters of a corresponding plurality of short-term rentals of the property during the plurality of preliminary intervals, and (4) retrieving property telematics data associated with the plurality of short-term rentals, wherein the property telematics data is generated by one or more property telematics devices associated with the property. The property telematics data may be indicative of actual usage of the property during the plurality of short-term rentals. The method may also include (5) developing an average risk level profile of the plurality of short-term rentals based upon the parameters of the plurality of short-term rentals and the property telematics data, the average risk level profile indicating an average level of risk presented by the plurality of short-term rentals. The method may still further include (6) determining a long-term adjusted coverage rate based upon the average risk level profile, and/or (7) transmitting (such as via wireless communication or data transmission over one or more radio links or wireless communication channels) a coverage report including the long-term adjusted coverage rate to a mobile device of a homeowner associated with the property for review and approval of the long-term adjusted coverage rate.

Advantages will become more apparent to those skilled in the art from the following description of the preferred embodiments which have been shown and described by way of illustration. As will be realized, the present embodiments may be capable of other and different embodiments, and their details are capable of modification in various respects. In addition, although certain steps of the exemplary processes are numbered, having such numbering does not indicate or imply that the steps necessarily have to be performed in the order listed. The steps may be performed in the order indicated or in another order. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
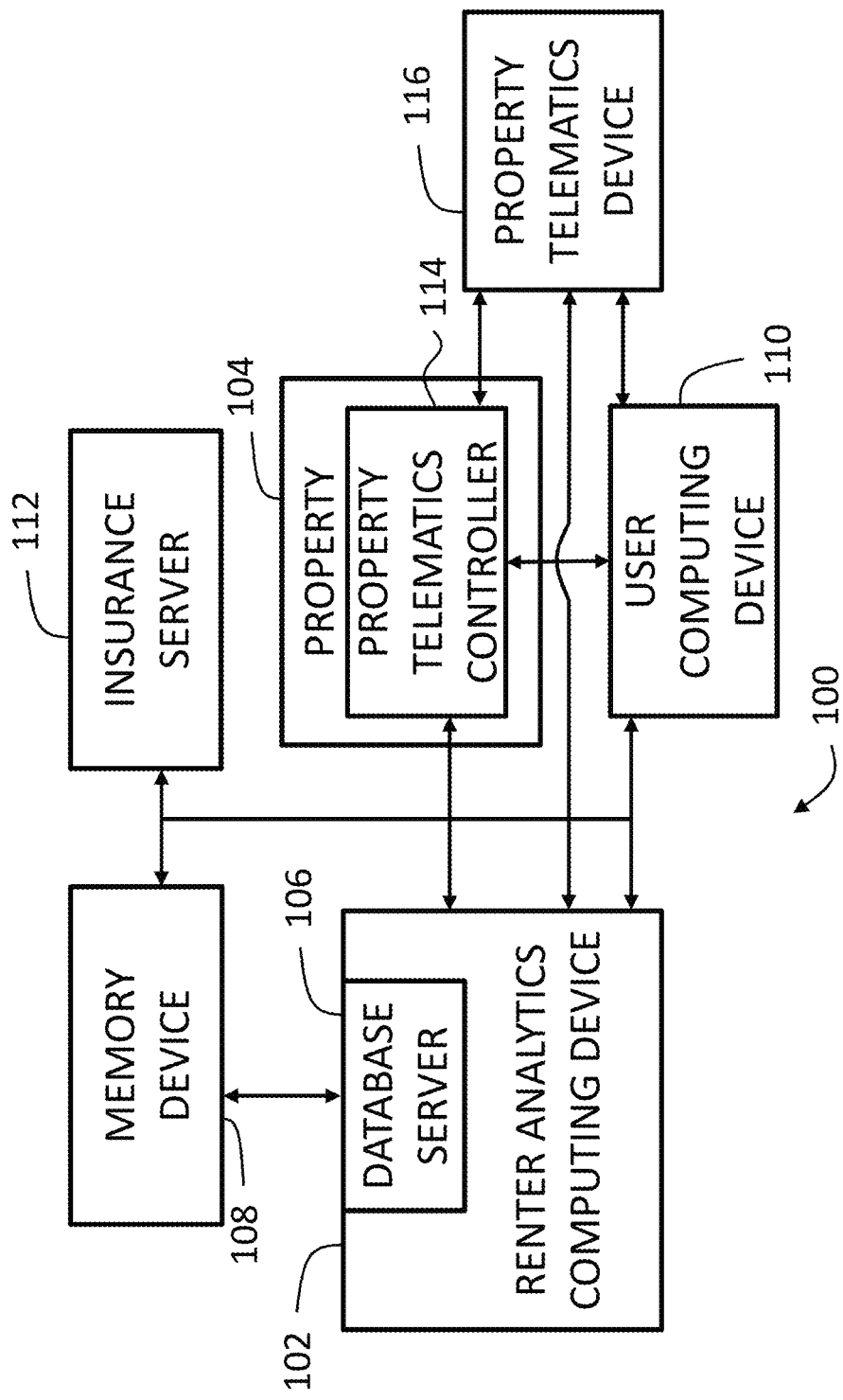
FIG. 1 illustrates a schematic diagram of an exemplary property-sharing system.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter alia, systems and methods for analyzing property telematics data to update risk-based coverage of a property. As more homeowners (and some long-term renters or leasers of a property) turn to short-term rentals of their property for a new source of income, insurance companies may need a new way to accurately track the rental or "shared" usage of the property. In particular, such variables as when a property is shared, how much of the property is being shared (e.g., just a single room, living space, or the entire property), and/or how many renters are sharing the property can have an impact on the amount of risk associated with a particular short-term rental. In order to best protect the homeowner from liability for any damage incurred by the renters, it would be desirable to have a system that tracks shared usage and adjusts risk-based insurance coverage of the property accordingly.

Moreover, it may be difficult to associate incurred damage with particular renters without a timely and thorough inspection process. In at least some current systems, the inspection process may be performed in-person, and may be difficult to schedule and complete for a variety of reasons. Accordingly, it would also be desirable to have an automated inspection process that may be performed by the homeowner on their own schedule, which may improve and make more efficient the damage reporting and insurance claim submission processes.

The property-sharing systems and methods described herein are directed to tracking shared usage of a property and offering an adjusted coverage rate based upon a risk level associated with the shared usage. The property-sharing systems and methods integrate property-sharing application platforms (e.g., AIRBNB®, VRBO®, etc.; registered trademarks property of Airbnb, Inc, San Francisco, CA, and Homewaway.com, Austin, TX, respectively) with property telematics devices to determine usage parameters of a short-term rental. For example, the property-sharing application platforms may enable reporting of a period of time associated with the short-term rental (e.g., a start date and end date), a rental rate, a number of anticipated renters, and an indicator of the shared space (e.g., room rental, partial property rental, or whole home rental). For instance, the property telematics devices may track a number of actual renters (which may be the same as or differ from the number of anticipated renters), the actual shared space, a usage of one or more utilities (e.g., excessive water, electricity, and/or HVAC usage), increased-risk behaviors (e.g., leaving doors unlocked or open, leaving a security system unarmed), and/or emergency events (e.g., occurrences of smoke or fire alarms triggered and/or frequency thereof).

The property-sharing applications platforms may enable collection sufficient data prior to a short-term rental, such that an adjusted coverage rate (e.g., representing an insurance quote) may be offered to the homeowner before the short-term rental occurs. The property telematics devices may enable reporting of real-time actual usage (e.g., during the short-term rental) and/or collective actual usage (e.g., after the short-term rental), such that an (additional and/or alternative) adjusted coverage rate may be offered to the homeowners after the short-term rental has occurred (e.g., on a one-time or per-interval basis, such as monthly). In one exemplary embodiment, either before or after the short-term rental, an insurance provider may offer the adjusted coverage rate to the homeowner. The insurance provider may offer the adjusted overage rate via email, text message, phone message, push notification to a user computing device (e.g., a smartphone or tablet), and/or via an in-app message, for instance, within an insurance-specific software application (e.g., Pocket Agent® Mobile App, Pocket Agent® is a registered trademark of State Farm Mutual Automobile Insurance company, Bloomington, IL), the property-sharing software application, and/or a property telematics software application. The homeowner may approve or accept the offer. In some embodiments, the homeowner may reject the offer and/or request changes to the offer.

Selecting either of these options may trigger communication with a representative of the insurance provider (e.g., an agent or underwriter) to discuss the homeowner's selection. Additionally and/or alternatively, an insurance provider may offer the homeowner a long-term adjusted coverage rate designed to cover frequent and/or extended short-term rentals, such that the homeowner need not request and/or receive an adjusted coverage rate on a per-rental or per-interval basis. By accepting the offer of the adjusted coverage rate, the homeowner receives adjusted (or increased) coverage of their property, such that they are protected for certain damage and/or costs associated with the short-term rental.

In some embodiments, the property telematics devices may enable developing a profile or status of the property before and after each short-term rental. For example, the property telematics devices may facilitate generating a pictorial profile of the property (e.g., including a plurality of images of the property) to develop a baseline status of the property before a short-term rental. A pictorial profile of the property may be generated after a short-term rental to develop a subsequent status for comparison to the baseline status, to determine a nature and extent of any damage incurred to the property during the short-term rental. The homeowner may use the property telematics devices to develop the subsequent status automatically (e.g., without requiring external input or influence from an insurance provider and/or claims handler).

In the event damage has been incurred, the homeowner may submit a claim to the insurance provider with the baseline status and subsequent status as proof of the damage. As the homeowner may be obligated to perform such a status update within a certain amount of time after a short-term rental has concluded, the damage may be more readily associated with a particular renter or set of renters for claims handling and/or dispute resolution.

In the exemplary embodiments, the property-sharing systems may include a renter analytics computing device. The renter analytics computing device may process, compare, verify, analyze, and/or otherwise handle data received and/or retrieved from the property-sharing application platform and/or the property telematics device(s) that is associated with one or more short-term rentals. The renter analytics computing device may further generate a risk level profile associated with each short-term rental and may calculate the adjusted coverage rate based upon the risk level profile. In some embodiments, the renter analytics computing device may transmit a coverage report to the homeowner associated with the property, the coverage report including the adjusted coverage rate, such that the homeowner may review and approve the adjusted coverage rate.

The renter analytics computing device may receive one or more initial inputs from the property telematics devices associated with the property before a short-term rental and may develop a baseline profile of the property based upon the one or more initial inputs. In certain embodiments, the renter analytics computing device may automatically initiate the capture of the one or more initial inputs by the property telematics devices, for example, by transmitting an instruction thereto. The renter analytics computing device may retrieve one or more subsequent inputs from the property telematics devices after a short-term rental and may develop a subsequent profile of the property based upon the one or more subsequent inputs. The renter analytics computing device may compare the subsequent profile to the baseline profile to determine whether any damage was incurred to the property during the short-term rental and, if so, a nature and/or extent of that damage. In certain embodiments, the renter analytics computing device may automatically initiate the capture of the one or more subsequent inputs by the property telematics devices, for example, by transmitting an instruction thereto. The renter analytics computing device may, in some embodiments, automatically generate an insurance claim for any damage incurred. The insurance claim may include a description and/or indication of a location, nature, and/or extent of the damage incurred. The renter analytics computing device may request approval from the homeowner before transmitting an automatically generated claim to the insurance provider for claims handling.

"Property," as used herein, may refer generally to any residential building and/or to particular spaces therein. For example, a property may include (but is not limited to) a home, an apartment, a condominium, a bedroom, a suite, "common areas" (e.g., a kitchen, a living room, a bathroom, etc.), etc.

"Homeowner," as used herein, may refer generally to a person having a long-term contractual and/or financial responsibility for a property. Homeowners may include, for example, actual homeowners, long-term lessees, and/or long-term renters of a property. Moreover, "homeowner" used in a singular fashion should be understood to encompass an entire family and/or "group" of people associated with the property. "Renters" are distinguished from "homeowners" in that their association with a property is limited to the terms of the short-term rental. Renters may have no financial/contractual obligation associated with the property itself but rather have such an obligation to the homeowner.

"Long-term" may refer generally to a length of time greater than about six months, for which the contractual and/or financial responsibility extends (e.g., the length of a lease or mortgage). "Short-term", in contrast, may refer generally to a length of time less than about six months, for which a renter is associated with a short-term rental of the property.

"Short-term rental," as used herein, may refer generally to an individual agreement for one or more renters to use the property by paying a particular rental amount to the homeowner. A short-term rental may have a particular start date and end date, and accordingly may extend for a period of time measured between the start date and the end date.

"User computing device" may refer to any device capable of accessing the Internet including, but not limited to, a desktop computer, a mobile device (e.g., a laptop computer, a personal digital assistant (PDA), a cellular phone, a smartphone, a tablet, a phablet, netbook, notebook, smart watches or bracelets, smart glasses, wearable electronics, pagers, etc.), or other web-based connectable equipment. "Homeowner user computing device" may refer to one or more user computing devices specifically associated with the homeowner of a property. "Renter user computing device" may refer to one or more user computing devices that are not associated with the homeowner of the property, and therefore may be assumed to be associated with a renter at the property.

"Property telematics device," as used herein, may refer generally to any device configured to collect data associated with the property and/or to transmit that collected data to a property telematics controller. "Telematics" may refer to the technology of sending, receiving, and/or storing information via telecommunication devices, for example, to control a remote object and/or communicate data about a remote object. Property telematics devices may include, for example, sensors (e.g., thermometers, light sensors, motion sensors, proximity sensors, smoke detectors, carbon monoxide detectors, etc.), "Internet of Things" (IoT) connected devices (e.g., connected/programmable thermostats, lights, alarms, garage doors, appliances, etc.), meters (e.g., timers, utility meters, etc.), routers, modems, and/or any other such device. The property telematics devices discussed herein may also include smart devices, such as smart electronics, smart appliances, smart water meters, smart electricity meters, and/or smart thermostats that may include usage data and time of use data (such as to allow a processor to assign use of water, electricity, air conditioning, heat, appliances, electronics, etc. to specific users or groups of individuals). Property telematics (and/or smart) device(s) may be physically present at the property and/or may be remote from the property with a communication link (e.g., wired and/or wireless connection over one or more radio links or communication channels) to the property telematics controller.

A "property telematics controller," as used herein, may refer to a central interface and "hub" (or smart home controller) through which one, some, or all of the individual property telematics (and/or smart) devices associated with the property may be accessed and/or programmed. The property telematics controller, as described further herein, may collect, receive, retrieve, access, and/or transmit data from one, some, or all of the property telematics devices communicatively connected thereto (e.g., via a wired and/or wireless connection). Where "property telematics controller" is used herein, the term may refer to the central hub and interface and/or to one or more property telematics devices accessible therethrough. In some embodiments, the property telematics controller may include a device physically present at the property that is a dedicated property telematics controller. In some embodiments, the property telematics controller may additionally or alternatively include a user computing device (e.g., smartphone or tablet) having one or more software applications ("apps") downloaded and installed thereon such that the user computing device may function as the property telematics controller.

"App," as used herein, may refer generally to a software application installed and downloaded on a user interface of the property telematics controller and/or a user computing device associated with a homeowner and/or a renter. For instance, a user computing device may have installed thereon a property-sharing application through which a homeowner manages the sharing of their property, a property telematics application through which the homeowner accesses and/or programs one or more property telematics devices at their property, and/or an insurance application through which the homeowner may receive information from and/or transmit information to an insurance provider.

"Pairing," as used herein, may refer generally to registering a connection between the property telematics controller (and/or an individual property telematics device) and a user computing device such that the user computing device may be recognized by the property telematics controller as that particular user computing device, and/or such that the user computing device may communicate with the property telematics controller (e.g., to input information to the property telematics controller and/or receive information from the property telematics controller).

Rather than merely relying on a homeowner to report when and how their property is being shared, it may be beneficial to leverage data from a property-sharing application platform and data from one or more property telematics devices to determine and verify parameters of a short-term rental. Based upon the parameters of each short-term rental, a risk level associated with the property may change. For instance, a property may have a "baseline" risk level associated with the property itself (e.g., risks for natural disasters, safety/prevention features such as smoke alarms and security systems, etc.) and/or with the homeowner (e.g., low occurrences of high-risk behavior, such as leaving devices on when not home or leaving a door open/unlocked). When one or more renters are associated with a property during a short-term rental, the risk level of the property may increase beyond the baseline risk level to a "rental risk level." The particular rental risk level for a particular short-term rental may be dependent upon, for instance, a number of renters, duration of the short-term rental, and/or an amount of the property being shared. Additionally or alternatively, the rental risk level may be dependent upon the behavior of the renters, such as an occurrence and/or frequency of high-risk behaviors that put the property at higher risk for damage (e.g., excessive and/or negligent appliance or utility use, leaving a door open/unlocked, triggering emergency alerts such as a fire or security alarm, etc.). Accordingly, it may be beneficial to develop a risk level profile associated with a short-term rental, wherein the risk level profile influences an adjusted (risk-based) coverage rate for the property. Moreover, it may be beneficial to employ one or more methods to determine the parameters of the short-term rental and/or actual usage of the property during the short-term rental to develop the risk level profile.

In the exemplary embodiment, the property may include (e.g., have physically present at the property) a property telematics controller that allows the property to communicate with other devices, for example, via the Internet or any other wired or wireless connection (e.g., Bluetooth®, registered trademark of Bluetooth Sig, Inc., Kirkland, WA) over one or more radio links or wireless communication channels. In the exemplary embodiment, the property telematics controller may be in communication with one or more property telematics devices associated with the property (e.g., one or more utility sensors, one or more IoT-connected appliances, a wireless router, a security system, etc.). The property telematics controller may additionally or alternatively be in communication with one or more user computing devices that are each associated with the homeowner. In some embodiments, the property telematics controller and/or one or more property telematics device(s) may have "application pairing" functionality, such that homeowner may engage with a property telematics app on a user interface at the property telematics controller and/or on their user computing device (e.g., their smartphone or tablet). The property telematics controller may include and/or be in communication with a renter analytics computing device to transmit information therebetween.

In the exemplary embodiment, one or more renters may "book a stay" or request a short-term rental at the property using the property-sharing application platform, which causes generation of a pre-rental record. The pre-rental record may describe the parameters of the short-term rental, as provided by the renter(s). For example, the pre-rental record includes an indication of a number of renters, a start date and end date of the short-term rental (and, therefore, a duration of the rental), and a shared space identifier (e.g., "shared room," "private room," "whole property," etc.) identifying which space(s) of the property are to be shared with the renters during the short-term rental.

The renter analytics computing device may receive and/or retrieve each pre-rental record associated with the property from a computing device associated with the property-sharing application platform. This computing device may include a homeowner user computing device, a renter user computing device, and/or a server computing device specifically dedicated to the property-sharing application platform. The renter analytics computing device may process the pre-rental record to identify the parameters of the short-term rental.

In the exemplary embodiment, the property telematics controller and/or one or more individual property telematics device(s) associated with the property may be configured to detect, track, and/or record the presence of one or more renters and/or the behavior or one or more renters as represented by their interaction(s) with the property telematics device(s). It should be understood that such detecting, tracking, and/or recording may be performed without the identification of any particular renter or personal information thereof. Rather, detecting, tracking, and/or recording may be performed on a qualitative and/or anonymous/collective basis, such as detecting, tracking, and/or recording a number of renters, whether/how long a utility or appliance is used, whether an emergency alarm is triggered, etc. In this way, the privacy, security, and identity of any renters may be protected while a risk level profile of the renters may be developed.

The renter analytics computing device may determine and track which user computing device(s) are present at the property. More particularly, the renter analytics computing device may determine whether one or more renter user computing devices is at the property, indicating that a renter is present at the property. For example, the homeowner may pair their homeowner user computing device(s) to the property telematics controller (and/or may pair with one or more individual telematics devices). When an unknown (i.e., unpaired) user computing device is recognized or detected by the property telematics controller, the property telematics controller may generate a record indicating the presence of this unknown or renter user computing device at a particular time and/or for a duration of time. Moreover, the property telematics controller may recognize or detect a plurality of these renter user computing devices and may indicate (e.g., in a generated record) a number of renter user computing devices at the property, which may verify or contradict the number of anticipated renters indicated in the pre-rental record. The property telematics controller may transmit any such record to the renter analytics computing device.

In some embodiments, the property telematics controller may be in communication with a wireless router at the property, the wireless router configured to provide access to a wireless Internet connection at the property. The property telematics controller may record how many renter user computing device(s) pair with the wireless router and the duration of such pairing, and may transmit a record of such data to the renter analytics computing device. Additionally or alternatively, the property telematics controller may be in communication with one or more motion and/or presence sensors at the property. Motion and/or presence sensors may include light-based sensors (e.g., structured light sensors, LIDAR, infrared sensors, etc.), sound-based sensors, temperature based sensors, other sensors, and/or a combination thereof, configured to detect, track, and/or record a presence of renters and/or a number of renters at the property, without specifically identifying any one renter. The property telematics controller may be configured to transmit a record of such data to the renter analytics computing device. Moreover, any of these sensors may be further employed to detect, track, and/or record the usage of and/or presence in particular spaces of the property, to ensure that only spaces identified as "shared space" are being accessed/used by the renters and/or determine how much of the property is being used as "shared space." The property telematics controller may be configured to transmit a record of such data to the renter analytics computing device.

Additionally or alternatively, as described further herein, the property telematics controller may be in communication with one or more utility-usage sensors, such as electricity or water sensors, and/or appliance-usage sensors, such as an oven-or television-usage sensor or meter. These "usage sensors" may be configured to detect, track, and/or record utility/appliance usage in shared spaces during the short-term rental. The property telematics controller may be configured to transmit a record of such data to the renter analytics computing device.

A number of renters may be estimated according to utility usage. For instance, the renter analytics computing device may store a range of "typical" utility usage. The renter analytics computing device may compare an actual utility usage recorded by the utility sensors and transmitted to the renter analytics computing device to this "typical" utility usage and estimate a number of renters at the property/using the utility. Such an estimation may be used to verify a number of renters present at the property as indicated by the rental record and/or corroborate a number of renters recorded by another property telematics device.

In some embodiments, the renter analytics computing device and/or the property telematics controller may prompt confirmation of a renter's presence by pushing a confirmation request to at least one of a homeowner computing device and the detected renter computing device. Such a confirmation request may permit the homeowner to correct mistakes, for example, if a homeowner has a non-renter visitor present at the property during the short-term rental. In addition, some renters may have multiple user computing or mobile devices, such as a smartphone, a tablet, smart glasses, wearable electronics, smart watches, and a laptop. In some embodiments, a homeowner may ask their renters to identify a number of renter user computing devices associated with each renter, and may transmit a notification of the number of computing devices per renter to the renter analytics computing device. In this way, the renter analytics computing device is prevented from dramatically over-estimating a number of renters at the property during the short-term rental (e.g., six instead of two), which may result in an overly high risk level. In other embodiments, the property telematics controller and/or the renter analytics computing device may be configured to distinguish a smartphone from other user computing devices, and may be further configured to only "count" smartphones in the identification of the number of renters present at the property.

The property telematics controller may be further configured to track and record utility and/or appliance usage during the duration of a short-term rental. In particular, the property telematics controller may be configured to track and record utility and/or appliance usage in the space of the property that is indicated as "shared space" during the short-term rental. The property telematics controller may be in communication with one or more utility-usage sensors, such as electricity or water sensors, and/or appliance-usage sensors, such as an oven-or television-usage sensor or meter. These "usage sensors" may be configured to detect, track, and/or record utility/appliance usage in shared spaces during the short-term rental. The property telematics controller may be configured to transmit a record of such data to the renter analytics computing device.

Moreover, any of these sensors may be further employed to detect, track, and/or record the usage of and/or presence in particular spaces of the property, to ensure that only spaces identified as "shared space" are being accessed/used by the renters and/or determine how much of the property is being used as "shared space." For example, if only one room is indicated as shared space, the property telematics controller may track and record utility and/or appliance usage in that room. In this way, excessive and/or negligent usage of utilities and/or appliances in that room may be associated with that short-term rental (and/or the renter(s)), such that any damage or other costs incurred as a result of such usage may be covered by adjusted insurance coverage associated with the property.

Additionally or alternatively, the property telematics controller may be in communication with a variety of other property telematics devices configured to detect, track, and/or record various types of data. This data may be transmitted to the renter analytics computing device for use in developing a risk level profile associated with the short-term rental. For instance, the property may have a security system associated therewith. A security device may record when a security alarm is triggered and/or left deactivated during a short-term rental. A security device may additionally and/or alternatively detect when doors, windows, garage doors, and/or other points of entrance and/or egress are left open and/or unsecured. As another example, the property may include one or more "smart" smoke/fire detectors and/or sprinkler systems, which may record when they are triggered. As another example, the property may include one more "smart" appliances and/or appliance-usage sensors configured to detect, track, and/or record usage of the appliance. The renter analytics computing device may process this usage data to determine whether an appliance was active/left on for an atypical/threshold period of time (e.g., a coffeepot left on for more than two hours, a stove left on for more than 1.5 hours, etc.). The renter analytics computing device may increase a risk level associated with the short-term rental upon detection of any of these events (and/or additional or alternative events), as they indicate negligence and/or higher-risk behavior.

In one embodiment, the renter analytics computing device may develop a risk level profile based uponly upon the parameters of the short-term rental parsed from the pre-rental record. In another embodiment, the renter analytics computing device may develop the risk level profile based uponly upon the data transmitted from the property telematics controller and/or the property telematics devices ("property telematics data") to the renter analytics computing device. The renter analytics computing device may process the property telematics data to determine actual usage of the property by the renters and may use the actual usage to develop the risk level profile. In still other embodiments, the renter analytics computing device may develop the risk level profile based upon both the parameters of the short-term rental and the actual usage of the property by the renters.

The renter analytics computing device may develop the risk level profile according to risk analysis rules, which apply a level of risk to particular parameters and/or behaviors. For instance, an increased risk level may be applied to a short-term rental with an increased number of renters, and/or an increased risk level may be applied to a short-term rental in which a smoke alarm was triggered. The risk level of any and/or all parameters, behaviors, and/or other data available to the renter analytics computing device may be aggregated and/or otherwise processed to develop the risk level profile. In this way, a change in one "aspect" or "element" of the risk level profile (e.g., the duration of the short-term rental) may cause a change in the risk level profile without necessarily affecting any other "aspects" of the risk level profile.

According to the developed risk level profile, the renter analytics computing device may calculate and/or otherwise determine (e.g., using a look-up table) an adjusted coverage rate associated with the short-term rental. In some embodiments, the adjusted coverage rate is associated with just one short-term rental. In other embodiments, an adjusted coverage rate may be associated with an interval of time (e.g., a billing interval, such as a month). In these embodiments, the renter analytics computing device may develop a risk level profile for each individual short-term rental occurring during the interval and may determine an adjusted coverage rate applicable to each short-term rental. The renter analytics computing device may average, sum, and/or otherwise aggregate each adjusted coverage rate into a "total" adjusted coverage rate applicable to the entire interval. The renter analytics computing device may transmit a coverage report including the adjusted coverage rate to the homeowner (e.g., as an email, push notification, text message, in-app message, etc.). The homeowner may accept or approve the adjusted coverage rate. In some embodiments, the homeowner may be permitted to refuse or reject the adjusted coverage rate (which may leave the homeowner liable for any damage to the property during the short-term rental) and/or request changes to the adjusted coverage rate.

The adjusted coverage rate may include an additional rate on top of a baseline insurance coverage rate associated with the property. In other words, the adjusted coverage rate may include a "surcharge" over a baseline insurance coverage rate, as a separate rate associated with one short-term rental and/or one interval of time. In this example, the coverage report may offer the adjusted coverage rate as follows: "You can be covered for this [short-term rental]/[interval] for only $XX. Would you like to add this coverage?" Alternatively, the adjusted coverage rate may include an adjusted baseline coverage rate that is increased according to the risk level profile. In this example, the coverage report may offer the adjusted coverage rate as follows: "You can be covered for this [short-term rental]/[interval] by increasing your rate this month to $XX. Would you like to increase your current coverage?"

In some embodiments, the renter analytics computing device may offer a "preliminary" adjusted coverage rate to the homeowner, for instance, when a homeowner is just starting to offer their property for short-term rentals. The preliminary adjusted coverage rate may represent an estimated premium configured to cover "average" short-term rentals. The preliminary adjusted coverage rate may be applied for one or more "preliminary intervals" (e.g., a first three months or a first six months), during which the actual shared usage of the property (e.g., a number of short-term rentals, a percentage of time the property is shared, an average/median/aggregated risk level profile of the short-term rentals, etc.) is determined. After the preliminary intervals, a long-term adjusted coverage rate (which may be rather than, less, than, or equal to the preliminary adjusted coverage rate) may be offered to the homeowner. The long-term adjusted coverage rate may be designed to cover the "average actual" short-term rental usage, and associated risk, at the property. In this way, the homeowner may not need to accept/approve an adjusted coverage rate each interval/each short-term rental. Such an embodiment may be preferable for homeowners that share their property frequently and/or for a large percentage of each interval.

Additionally or alternatively, the homeowner may agree to pay the long-term adjusted coverage rate each month (or other billing interval) but may be credited or debited any variation from the amount of the long-term adjusted coverage rate if the property is rented more or less than usual or is otherwise associated with more/less risk. In certain embodiments, a homeowner may only make their property available for sharing during certain parts of the year. For instance, a homeowner may only share their summer home during non-summer months, when they are not present there. In these embodiments, the homeowner may notify their insurance provider that no short-term rentals will be occurring for a specific period of time. Accordingly, the insurance provider may revert their insurance rate back to a non-adjusted rate.

In the exemplary embodiment, the property-sharing system is further configured to enable the homeowner to easily track and record a status of their property before and after each short term rental, by leveraging the property telematics devices at the property. For example, the property telematics devices may include or more cameras, one or more sensors (e.g., temperature sensors, water sensors, air quality sensors, etc.), and/or any other property telematics devices configured to record information associated with a status of the property. In one embodiment, the renter analytics computing device may receive and/or retrieve initial records or inputs from the property telematics devices associated with the property before a short-term rental. In some cases, the homeowner may additionally or alternatively submit one or more initial records to the renter analytics computing device. The one or more initial records may include, for example, pictures, average temperature in certain spaces of the property, an air quality level (e.g., no smoke), and/or other information recorded and transmitted by a property telematics device and/or a homeowner user computing device. The renter analytics computing device may develop a baseline profile of the property based upon the one or more initial records. In certain embodiments, the renter analytics computing device may automatically initiate the capture of the one or more initial records by the property telematics devices, for example, by transmitting an instruction thereto. In this way, the homeowner need not even be present at the property for the baseline profile to be developed.

The renter analytics computing device may receive and/or retrieve one or more subsequent records or inputs from the property telematics devices after a short-term rental. In some cases, the homeowner may additionally or alternatively submit one or more subsequent records to the renter analytics computing device. The one or more subsequent records may include, for example, pictures, average temperature in certain spaces of the property, an air quality level (e.g., a level of smoke), and/or other information recorded and transmitted by a property telematics device and/or a homeowner user computing device. The renter analytics computing device may develop a subsequent profile of the property based upon the one or more subsequent inputs. In certain embodiments, the renter analytics computing device may automatically initiate the capture of the one or more subsequent inputs by the property telematics devices, for example, by transmitting an instruction thereto.

The renter analytics computing device may compare the subsequent profile to the baseline profile to determine whether any damage was incurred to the property during the short-term rental and, if so, a nature and/or extent of that damage. The renter analytics computing device may, in some embodiments, automatically generate an insurance claim for any damage incurred. The insurance claim may include a description and/or indication of a location, nature, and/or extent of the damage incurred. The renter analytics computing device may request approval from the homeowner before transmitting an automatically generated claim to the insurance provider for claims handling.

It should be understood that although the renter analytics computing device is described as performing various functions, other components of the property-sharing system may additionally and/or alternatively perform certain functions.

For example, in some embodiments, the renter analytics computing device may develop the risk level profile and transmit the risk level profile to an insurance server computing device associated with the insurance provider. The insurance server may then determine the adjusted coverage rate and contact the homeowner to offer the adjusted coverage rate (e.g., in a coverage report). As another example, the insurance server computing device may handle one or more steps of a claims generating and/or claims handling process. Additionally or alternatively, the renter analytics computing device may be integral to an insurance server computing device, such that any functions described as performed using the renter analytics computing device may be performed by the insurance server computing device.

The methods and systems described herein may be implemented using computer programming or engineering techniques including computer software, firmware, hardware, or any combination or subset. As disclosed above, at least one technical problem with current property-or home-sharing systems is that there is a need for determining when a property is actually being rented, verifying that the actual rental is in compliance with the agreed-upon parameters of the rental, and determining how much risk is associated with the rental. Many homeowner's insurance policies do not currently cover short-term rental frequency above particular thresholds, thus there is also a need for permitting adjustments to existing policies that permit homeowners to rent their property while being covered for any damage to their property. A serious technical problem arises in determining actual usage of a property during a short-term rental and the risk associated with that usage. More specifically, current systems provide no way to determine presence of a number of renters and associate risk levels with those renters. In addition, there is a need for a system configured to enable more convenient and/or automated claims generation processes in the event of any damage to the property during a short-term rental.

The technical effect of the systems and processes described herein may be achieved by performing at least one of the following steps, with homeowner and/or renter permission or affirmative consent: (i) retrieving insurance policy information associated with an insurance policy issued for the property, the insurance policy information including a baseline coverage rate; (ii) retrieving a pre-rental record including parameters of a short-term rental of the property, the parameters including an anticipated number of renters, a start date, an end date, and an indicator of shared space; (iii) retrieving property telematics data associated with a duration of time between the start date and the end date, wherein the property telematics data is generated by one or more property telematics devices associated with the property, the property telematics data indicative of actual usage of the property during the short-term rental; (iv) developing a risk level profile associated with the short-term rental based upon the parameters of the short-term rental and the property telematics data; (v) determining an adjusted coverage rate to cover the property for the duration of time based upon the risk level profile, the adjusted coverage rate independent of the baseline coverage rate; and (vi) transmitting a coverage report including the adjusted coverage rate to a homeowner associated with the property for review and approval of the adjusted coverage rate.

The resulting technical effect is that the risk associated with a short-term rental (or a plurality of such rentals) may be covered with an offering of adjusted coverage to the homeowner. The adjusted coverage rate is determined based upon the risk of the short-term rentals, such as a number of renters or frequency of rental, as well as on actual usage of the property by the renters. A solution to the above-described problems provided by the property-sharing system is verification of the parameters of the short-term rental, as well as a characterization of risky behaviors exhibited by the renters, such that fair but comprehensive adjusted coverage rates may be offered to a homeowner. The shared-property system may include a plurality of methods for determining how many renters are present at the property, as described more fully herein, as well as the actual usage of the property by those renters. Some of these methods include using sensor data and/or assessing other presence indicators such as unknown guest devices connected to a router. Moreover, by leveraging property telematics devices to develop before-and-after profiles of the property, the homeowners may generate claims more efficiently and with more certain association with particular short-term rentals/renters.

In current systems, insurance providers may largely rely on a homeowner voluntarily alerting them of short-term rental activity. Moreover, the only way that the homeowner can determine when damage occurred to their home may be by an in person inspection, which may be difficult depending on logistics. Also, quite a bit of time may pass between the occurrence of the damage and the inspection. The systems and methods describe herein may provide a solution to these problem by integrating home-sharing platforms (e.g., AIRBNB®) and "Smart Home" technologies (e.g., Smart Things™) to gather relevant data to detect at least one of the following: (A) when the home is being rented, and (B) risk of the rental. The systems and methods may gather from the home-sharing platform: (i) dates of the short-term rental, (ii) dollar amount of the short-term rental, (iii) number of reported guests, and/or (iv) whether it is a whole home, partial home, or room rental. The systems and methods may gather information from "smart home sensors" (and/or from any property telematics devices) to verify rental activity, such as (i) a number of actual guests and/or (ii) portion of the house actually used by renters, and/or to determine risk (rating and pricing) and potential damage occurrence. Risk may be determined based upon, for instance, (i) extraordinary use of appliances, HVAC system, or other connected electronics, (ii) non-standard periods of doors being left open, (iii) armed/unarmed periods of home security system, (iv) any emergency trigger events (e.g., smoke, water, etc.), (v) any emergency trigger times and frequencies, and/or (vi) power outage occurrences. Based upon the rental activity at the property, an insurance provider may then trigger an offer of additional insurance coverage if needed. This can be done via a software application (e.g., Pocket Agent®), email, an offer via the home-sharing or "Smart Home" app, or through push notifications. In addition, if a claim is submitted for damage to the home by renters, the smart home data may be accessed to determine fault.

Exemplary System

FIG. 1 depicts a schematic diagram of an exemplary property-sharing system 100. Property-sharing system 100 is configured to enable tracking of property usage associated with a property 104 during a short-term rental and/or generate and offer an adjusted risk-based (insurance) coverage rate to a homeowner (not shown) of property 104. In one exemplary embodiment, property-sharing system 100 may include and/or facilitate communication between one or more renter analytics computing devices 102, a memory device 108, one or more user computing devices 110 (e.g., a homeowner user computing device 110 and/or one or more renter user computing devices 110), an insurance server 112, and a property telematics controller 114 associated with (e.g., physically located in/at) property 104.

Renter analytics computing device 102 may be any device capable of interconnecting to the Internet, including a server computing device, a mobile computing device or "mobile device," such as a smartphone, a personal digital assistant (PDA), a tablet, a wearable device (e.g., a "smart watch" or a personal projection device such as "smart glasses"), a "phablet," or other web-connectable equipment or mobile devices. Components of property-sharing system 100 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. In one embodiment, property telematics controller 114 may include renter analytics computing device 102. In other words, renter analytics computing device 102 may be located in property 104. In another embodiment, insurance server 112 may include renter analytics computing device 102.

Additionally, a database server 106 may be connected to memory device 108 containing information on a variety of matters. For example, memory device 108 may include such information as pre-rental records, short-term rental parameters, property telematics device records, risk levels and/or risk level profiles, insurance policy (e.g., rate) information, and/or any other information used, received, and/or generated by property-sharing system 100, as described herein. In one exemplary embodiment, memory device 108 may include a cloud storage device, such that information stored thereon may be accessed by one or more components of property-sharing system 100, such as, for example, renter analytics computing device 102, user computing device 110, insurance server 112, and/or property telematics controller 114. In one embodiment, memory device 108 may be stored on renter analytics computing device 102. In any alternative embodiment, memory device 108 may be stored remotely from renter analytics computing device 102 and may be non-centralized. Moreover, in any alternative embodiment, memory device 108 may be stored on insurance server 112.

Renter analytics computing device 102 may be in communication with property telematics controller 114, one or more user computing devices 110, and/or insurance server 112, such as via wireless communication or data transmission over one or more radio frequency links or wireless communication channels. In the exemplary embodiment, user computing devices 110 may be computers that include a web browser or a software application to enable renter analytics computing device 102 and/or property telematics controller 114 to access user computing devices 110, and vice versa, using the Internet or a direct connection, such as a cellular network connection. More specifically, user computing devices 110 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computing devices 110 may be any device capable of accessing the Internet including, but not limited to, a desktop computer, a mobile device (e.g., a laptop computer, a personal digital assistant (PDA), a cellular phone, a smartphone, a tablet, a phablet, netbook, notebook, smart watches or bracelets, smart glasses, wearable electronics, pagers, etc.), or other web-based connectable equipment. Additionally, user computing devices 110 may be communicatively coupled to renter analytics computing device 102, property telematics controller 114, and/or more or more property telematics devices 116 through many interfaces including, but not limited to, a direct cable connection, a Bluetooth® connection, and a Wi-Fi connection.

In the exemplary embodiment, property telematics controller 114 includes a communication interface (not shown) such that, with user (e.g., homeowner and/or renter) permission or affirmative consent, property telematics controller 114 may communicate with renter analytics computing device 102, user computing devices 110, memory device 108, insurance server 112, and/or one or more property telematics devices 116 for example, via the Internet. Property telematics devices 116 may include, for example, sensors (e.g., thermometers, light sensors, motion sensors, proximity sensors, smoke detectors, carbon monoxide detectors, etc.), "Internet of Things" (IoT) connected devices (e.g., connected/programmable thermostats, lights, alarms, garage doors, appliances, security systems, etc.), meters (e.g., timers, utility meters, etc.), routers, modems, and/or any other such device, and may include smart devices, such as smart electronics, smart appliances, smart water meters, smart electricity meters, and/or smart thermostats that may include usage data and time of use data. Property telematics controller 114 may further include a user interface (not shown) such that homeowners and/or renters at property 104 may access certain features of property telematics controller 114 (e.g., the communication interface, one or more apps, one or more property telematics devices 116 in communication therewith, etc.).

As described herein, property 104 is made available by a homeowner associated therewith for short-term rentals to one or more renters. The (anticipated) parameters of the short-term rental are described in a pre-rental record, which may be generated when the renter(s) book their short-term rental via a property-sharing application platform. Property 104 is described in further detail with respect to FIG. 2.

In some embodiments, renter analytics computing device 102 may be associated with an insurance provider. Renter analytics computing device 102 is configured to analyze the potential risk of one or more short-term rentals and offer to the homeowner an adjusted coverage rate, such that the homeowner may be protected and covered against any damage incurred during the short-term rental. A homeowner may register or sign up with the insurance provider to access the features and functionality of renter analytics computing device, as described herein. Renter analytics computing device 102 is configured to leverage the parameters included in the pre-rental record and data indicative of actual usage of property 104 during the short-term rental (e.g., from property telematics controller 114 and/or property telematics devices 116) to develop a risk level profile. Based upon the risk level profile, renter analytics computing device 102 determines an appropriate adjusted coverage rate. Renter analytics computing device 102 transmits a coverage report to the homeowner (e.g., to a homeowner user computing device 110), the coverage report including the adjusted coverage rate, for the homeowner's review and approval.

Insurance server 112 may be associated with and/or maintained by an insurance provider, which provides an insurance policy associated with property 104. The insurance policy described the metes and bounds of insurance coverage of property 104 provided to the homeowner. The insurance policy has associated therewith a particular (unadjusted) insurance coverage rate. Insurance server 112 may communicate with renter analytics computing device 102, property telematics controller 114, property telematics device(s) 116, user computing device(s) 110, and/or memory device 108 in order to transmit and/or receive information associated with the insurance policy. Moreover, insurance server 112 may communicate with any of these components of property-sharing system 100 to generate, transmit, analyze, and/or otherwise process an adjusted coverage rate associated with one or more short-term rentals. In some embodiments, insurance server 112 transmits the adjusted coverage rate to the homeowner for review and/or approval. Moreover, insurance server 112 may implement the adjusted coverage rate in conjunction with the insurance policy. Insurance server 112 may additionally generate, receive, and/or process claims generated in association with damage incurred to property 104 during a short-term rental.

Exemplary Property

Figure 2:
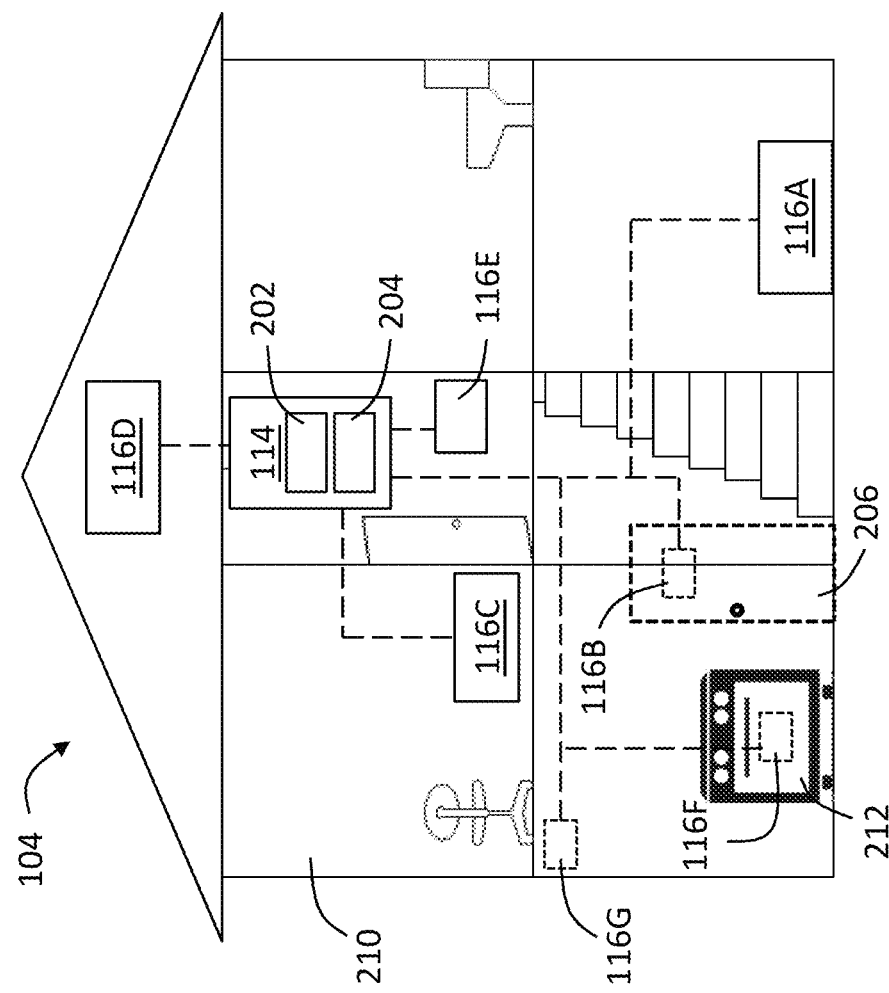
FIG. 2 illustrates a schematic diagram of an exemplary property that may be used in the property-sharing system shown in FIG. 1.

FIG. 2 depicts a view of an exemplary property 104 (shown in FIG. 1). Although property 104 is illustrated as a home or apartment, it should be understood that property 104 may include any other kind of residential property.

Property 104 may include a property telematics controller 114 as well a plurality of property telematics devices 116A, 116B, 116C, 116D, and 116E (collectively "property telematics devices 116"). In the illustrated embodiment, each property telematics device 116 may be communicatively coupled to property telematics controller 114, such that each property telematics device 116 may transmit records, reports, signals, and/or other data to property telematics controller 114. Property telematics controller 114 may include any computing device capable of interconnecting to the Internet, including a server computing device, a user computing device, a dedicated computing device designed to be a property telematics controller, or other web-connectable equipment or mobile devices.

In one embodiment, property telematics controller may include renter analytics computing device 102. In other words, renter analytics computing device 102 may be located in property 104. Property telematics controller 114 may be communicatively coupled to the Internet through a communication device 202. Additionally, property telematics controller 114 may communicate with renter analytics computing device 102 and/or user computing device(s) 110 (shown in FIG. 1) using communication device 202. Communication device 202 may include, for example, a wired or wireless network adapter and/or a wireless data transceiver for use with a mobile telecommunications network. Communication device 202 may be configured to communicate using many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, a cable modem, a Wi-Fi connection, and a Bluetooth® connection.

Property telematics controller 114 also includes a user interface 204. User interface 204 may include at least one media output component for presenting information to a homeowner and/or a renter, such as a display device (e.g., a cathode ray tube (CRT), liquid crystal display (LCD), light emitting diode (LED) display, or "electronic ink" display) or an audio output device (e.g., a speaker or headphones). In some embodiments, the media output component may be configured to present a graphical user interface (e.g., a web browser and/or a client application). User interface 204 may further include an input device for receiving input from a homeowner and/or a renter, such as, for example, a keyboard, a pointing device, a mouse, a stylus, and/or a touch sensitive panel (e.g., a touch pad or a touch screen).

Property telematics devices 116 may include, for example, a wireless router 116A, a security system component 116B, an electricity meter 116C, a light-based sensor 116D, an IoT-connected "smart" thermostat 116E, an IoT-connected "smart" oven sensor or meter 116F, and one or more cameras 116G. As described herein, wireless router 116A may pair with a homeowner user computing device 110, and may recognize unpaired or unknown renter user computing device 110 when renters with renter user computing devices 110 enter property 104. Wireless router 116A may transmit a signal to property telematics controller 114 indicating a number of renter user computing devices 110 connected to wireless router 116A, a time of connection, and/or a duration of connection.

Security system component 116B may be configured to detect when a door 206 to property 104 is locked or unlocked, open or closed, and/or "armed" or "unarmed" (i.e., a security system alarm, not shown, is armed or unarmed). Security system component 116B may transmit a signal to property telematics controller 114 whenever door 206 is left unlocked, open, and/or disarmed during a short-term rental.

Electricity meter 116C may track and monitor all electricity usage within one room 210 of property 104. Electricity meter 116C may continuously or at intervals transmit a signal to property telematics controller 114 indicating electricity usage within room 210. Additionally or alternatively, electricity meter 116C may be programmed to transmit a signal to property telematics controller 114 when electricity usage in room 210 increases above a predefined threshold.

Light-based sensor 116D may be configured to sense motion within one or more rooms of property 104 and transmit a signal to property telematics controller 114 when motion is sensed in any room during a short-term rental. Moreover, in some embodiments, light-based sensor 116D may be further configured to determine a number of people within a room of property 104. Light-based sensor 116D may be configured to transmit a signal of the number of people within property 104. Light-based sensor 116D may include, for example, a structured light sensor, LIDAR, infrared sensor, and/or any other light-based sensor.

Smart thermostat 116E may monitor and adjust, for example, HVAC usage according to one or more programmed schedules. Smart thermostat 116E may transmit signals to property telematics controller 114 when connected thermostat 116E adjusts the HVAC. Smart thermostat 116E may be further configured to transmit a signal to property telematics controller 114 when the HVAC is manually adjusted during a short-term rental.

Smart oven sensor 116F may be configured to monitor a length of time that an oven 212 is active or on, particularly during a short-term rental. Smart oven sensor 116F may be configured to transmit a signal to property telematics controller 114 when oven 212 is left on or "idling" (e.g., on with no detected interaction with oven 212) longer than a predefined threshold length of time.

Camera 116G may be configured to take one or more pictures of property 104 before and/or after a short-term rental. Property 104 may include as many cameras 116G as necessary to capture images of as much of property 104 as is being shared with renters during a short-term rental. Camera 116G may be configured to transmit any images/ pictures/image data captured thereby to property telematics controller 114 and/or directly to renter analytics computing device 102, such that renter analytics computing device 102 may develop an initial and/or subsequent profile of property 104.

Property telematics controller 114 may be configured to collect, receive, and/or request data from property telematics devices 116. Property telematics controller 114 may generate, process, store, and/or transmit telematics device records, including as described herein.

Exemplary Data Flow Within a Property-Sharing System

Figure 3:
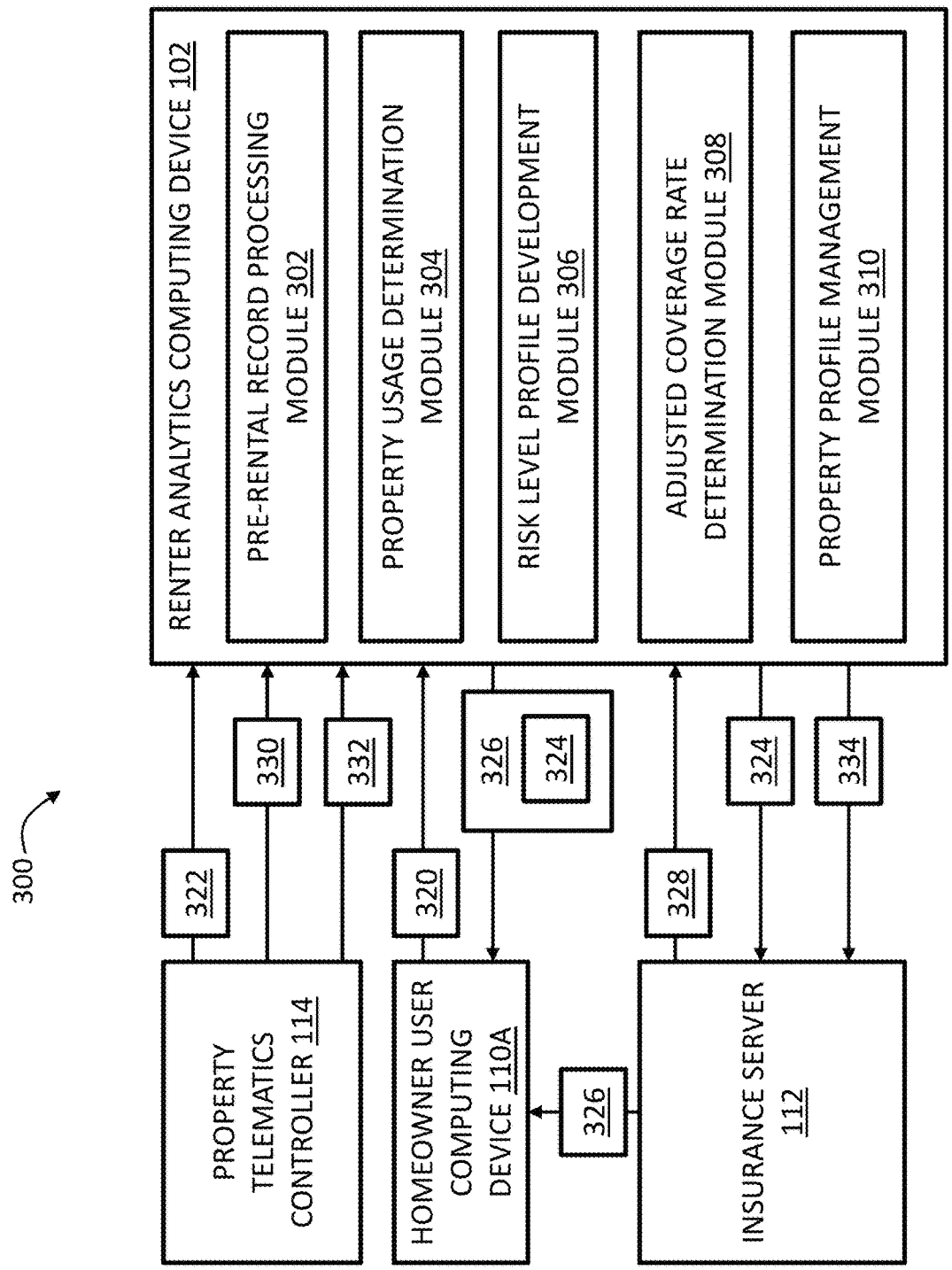
FIG. 3 illustrates a schematic diagram of an exemplary data flow between components of the property-sharing system shown in FIG. 1.
Figure 4:
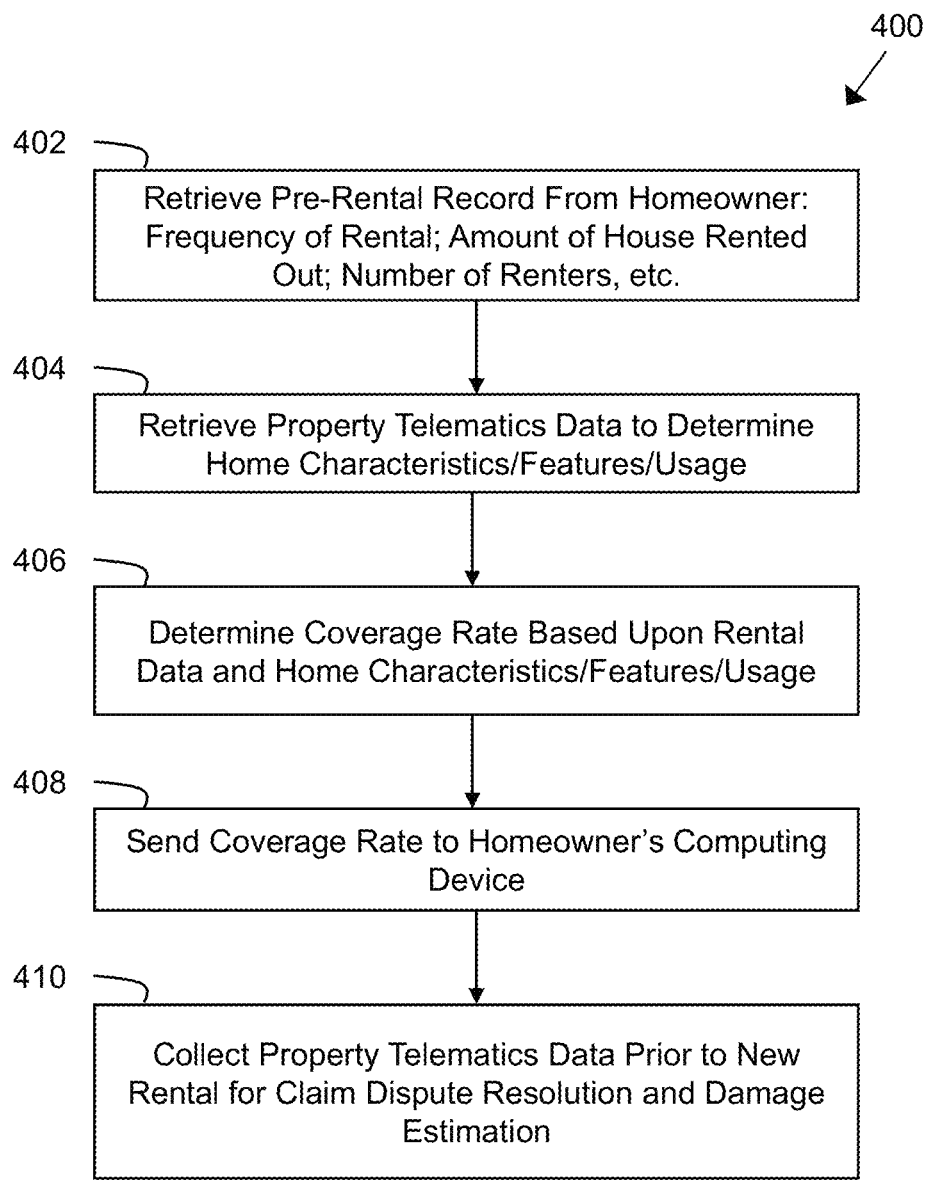
FIG. 4 illustrates a flow chart of an exemplary method for leveraging pre-rental records and property telematics data to offer an adjusted coverage rate using the property-sharing system shown in FIG. 1.

FIG. 3 depicts a schematic diagram 300 of an exemplary data flow between components of property-sharing system 100 (shown in FIG. 1), and FIG. 4 depicts a high-level flow chart of an exemplary process 400 for leveraging pre-rental records and property telematics data to offer an adjusted coverage rate. Further reference is made herein to both FIGS. 3 and 4.

In the exemplary embodiment, renter analytics computing device 102 may be in communication with one or more user computing devices 110 (both shown in FIG. 1), more particularly a homeowner user computing device 110A associated with a homeowner (not shown) of property 104 (also shown in FIG. 1). Renter analytics computing device 102 may also be in communication with insurance server 112 and property telematics controller 114 (both shown in FIG. 1), which itself may include and/or be in communication with a plurality of property telematics devices 116 (not shown in FIG. 3).

Renter analytics computing device 102 may include a plurality of executable modules, specifically a pre-rental record processing module 302, a property usage determination module 304, a risk level profile development module 306, an adjusted coverage determination module 308, and a property profile management module 310. Each module 302-310 may be configured to perform functions as described further herein. It should be understood that renter analytics computing device 102 may include additional, fewer, and/or alternative modules.

In the exemplary embodiment, one or more renters may "book a stay" or request a short-term rental at property 104 using a property-sharing application platform (not shown), which causes generation of a pre-rental record 320. Pre-rental record 320 may describe the parameters of the short-term rental, as provided by the renter(s). For example, pre-rental record 320 may include an indication of a number of renters, a start date and end date of the short-term rental (and, therefore, a duration of the rental), and a shared space identifier (e.g., "shared room," "private room," "whole property," etc.) identifying which space(s) of property 104 are to be shared with the renters during the short-term rental. Pre-rental record processing module 302 may receive and/or retrieve each pre-rental record 320 associated with property 104 from homeowner user computing device 110A (e.g., step 402 of process 400). In alternative embodiments, pre-rental record processing module 302 may receive and/or retrieve pre-rental records 320 from a renter user computing device 110, and/or a server computing device (not shown) specifically dedicated to the property-sharing application platform. Pre-rental record processing module 302 may process pre-rental record 320 to identify the parameters of the short-term rental.

In the exemplary embodiment, property telematics controller 114 (and/or one or more individual property telematics device(s) 116 associated with property 104) may be configured to detect, track, and/or record the presence of one or more renters and/or the behavior or one or more renters as represented by their interaction(s) with property telematics device(s) 116. It should be understood that such detecting, tracking, and/or recording may be performed without the identification of any particular renter or personal information thereof. Rather, detecting, tracking, and/or recording may be performed on a qualitative and/or anonymous/collective basis, such as detecting, tracking, and/or recording a number of renters, whether/how long a utility or appliance is used, whether an emergency alarm is triggered, etc. In this way, the privacy, security, and identity of any renters may be protected while a risk level profile of the renters may be developed.

In particular, property usage determination module 304 may be configured to receive and/or retrieve property telematics device records 322 (also referred to a "property telematics data" 322) from property telematics controller 114 (e.g., step 404 in process 400). Property usage determine module 304 may be further configured to process property telematics data 322 to determine usage of property 104 by renters during a short-term rental.

In one embodiment, property usage determination module 304 may determine and track which user computing device(s) 110 are present at property 104. More particularly, property usage determination module 304 may determine whether one or more renter user computing devices 110 is at property 104, indicating that a renter is present at property 104. For example, the homeowner may pair their homeowner user computing device(s) 110A to property telematics controller 114 (and/or may pair with one or more individual property telematics devices 116). When an unknown (i.e., unpaired) user computing device 110 is recognized or detected by property telematics controller 114, property telematics controller 114 may generate a record indicating the presence of this unknown or renter user computing device 110 at a particular time and/or for a duration of time. Moreover, property telematics controller 114 may recognize or detect a plurality of these renter user computing devices 110 and may indicate (e.g., in a generated record) a number of renter user computing devices 110 at property 104. Property telematics controller 114 may transmit any such record to property usage determination module 304. Property usage determination module 304 may process such records in property telematics data 322 to verify whether the number of renters recorded at property 104 by property telematics controller 114 matches the number of (anticipated) renters indicated in pre-rental record 320. If the number of (actual) renters is greater than the number of anticipated renters, such a short-term rental may be considered more high-risk (e.g., by risk level profile development module 306), both due to an increased number of renters and a potential lack of accountability or honesty thereof.

In some embodiments, property telematics controller 114 may be in communication with a wireless router at property 104, the wireless router configured to provide access to a wireless Internet connection at property 104. Property telematics controller 114 may record how many renter user computing device(s) 110 pair with the wireless router and the duration of such pairing, and may transmit a record of such data (i.e., property telematics data 322) to property usage determination module 304. Property usage determination module 304 may use such data 322 to track, record, and/or verify a number of renters at property 104 during the short-term rental.

Additionally or alternatively, property telematics controller 114 may be in communication with one or more motion and/or presence sensors at property 104. Motion and/or presence sensors may include light-based sensors (e.g., structured light sensors, LIDAR, infrared sensors, etc.), sound-based sensors, temperature based sensors, other sensors, and/or a combination thereof, configured to detect, track, and/or record a presence of renters and/or a number of renters at property 104, without specifically identifying any one renter. Property telematics controller 114 may be configured to transmit a record of such data (i.e., property telematics data 322) to property usage determination module 304. Property usage determination module 304 may use such data 322 to track, record, and/or verify a number of renters at property 104 during the short-term rental.

Moreover, any of these sensors may be further employed to detect, track, and/or record the usage of and/or presence in particular spaces of the property, to ensure that only spaces identified as "shared space" are being accessed/used by the renters and/or determine how much of the property is being used as "shared space." Property telematics controller 114 may be configured to transmit a record of such data (i.e., property telematics data 322) to property usage determination module 304. Property usage determination module 304 may use such data 322 to track, record, and/or verify particular spaces and/or an amount of space used by renters during the short-term rental. If certain spaces are used/accessed by the renters that were not identified in pre-rental record 320, such a short-term rental may be considered more high-risk (e.g., by risk level profile development module 306), both due to an increased amount of space that may incur damage and a potential lack of accountability or honesty of the renters.

Additionally or alternatively, property telematics controller 114 may be in communication with one or more utility-usage sensors, such as electricity or water sensors, and/or appliance-usage sensors, such as an oven-or television-usage sensor or meter. These "usage sensors" may be configured to detect, track, and/or record utility/appliance usage in shared spaces during the short-term rental. Property telematics controller 114 may be configured to transmit a record of such data (i.e., property telematics data 322) to property usage determination module 304. Property usage determination module 304 may estimate a number of renters at property 104 according to utility usage. For instance, property usage determination module 304 may store a range of "typical" utility usage. Property usage determination module 304 may compare an actual utility usage recorded by the utility sensors to this "typical" utility usage and estimate a number of renters at property 104/using the utility. Property usage determination module 304 may use such an estimation to verify a number of renters present at property 104 as indicated in pre-rental record 320 and/or corroborate a number of renters recorded by another property telematics device 116.

In some embodiments, property usage determination module 304 and/or property telematics controller 114 may prompt confirmation of a renter's presence by pushing a confirmation request to at least one of a homeowner user computing device 110A and a detected renter user computing device 110. Such a confirmation request may permit the homeowner to correct mistakes, for example, if a homeowner has a non-renter visitor present at property 104 during the short-term rental. In addition, some renters may have multiple user computing devices 110, such as a smartphone, a tablet, and a laptop. In some embodiments, a homeowner may ask their renters to identify a number of renter user computing devices 110 associated with each renter, and may transmit a notification of the number of computing devices 110 per renter to property usage determination module 304. In this way, property usage determination module 304 is prevented from dramatically over-estimating a number of renters at property 104 during the short-term rental based upon the number of user computing devices 110 (e.g., six instead of two), which may result in an overly high determination of risk level. In other embodiments, property telematics controller 114 and/or property usage determination module 304 may be configured to distinguish a smartphone from other user computing devices 110, and may be further configured to only "count" smartphones in the identification of the number of renters present at property 104.

Property telematics controller 114 may be further configured to track and record utility and/or appliance usage during the duration of a short-term rental. In particular, property telematics controller 114 may be configured to track and record utility and/or appliance usage in the space of property 104 that is indicated as "shared space" during the short-term rental. Property telematics controller 114 may be in communication with one or more utility-usage sensors, such as electricity or water sensors, and/or appliance-usage sensors, such as an oven-or television-usage sensor or meter. These "usage sensors" may be configured to detect, track, and/or record utility/appliance usage in shared spaces during the short-term rental. Property telematics controller 114 may be configured to transmit a record of such data (i.e., property telematics data 322) to property usage determination module 304 for processing thereby.

Moreover, any of these sensors may be further employed to detect, track, and/or record the usage of and/or presence in particular spaces of property 104, to ensure that only spaces identified as "shared space" are being accessed/used by the renters and/or determine how much of property 104 is being used as "shared space." For example, if only one room is indicated as shared space, property telematics controller 114 may track and record utility and/or appliance usage in that room. In this way, excessive and/or negligent usage of utilities and/or appliances in that room may be associated with that short-term rental (and/or the renter(s)), such that any damage or other costs incurred as a result of such usage may be covered by the adjusted insurance coverage rate.

Additionally or alternatively, property telematics controller 114 may be in communication with a variety of other property telematics devices 116 configured to detect, track, and/or record various types of data. This data may be transmitted to property usage determination module 304 for processing to determine usage of property 104.

Risk level profile development module 306 may be configured to process output from property usage determination module 304 and/or output from pre-rental record processing module 302 (e.g., parameters of a short-term rental) to develop a risk level profile of a short-term rental. A risk level profile is a metric representative of how high risk of damage is for one or more short-term rentals. In one embodiment, risk level profile development module 306 may develop a risk level profile based only upon the parameters of the short-term rental parsed from pre-rental record 320. In another embodiment, risk level profile development module 306 may develop the risk level profile based only upon property telematics data 322. In still other embodiments, risk level profile development module 306 may develop the risk level profile based upon both the parameters of the short-term rental and the actual usage of property 104 by the renters.

Risk level profile development module 306 may develop the risk level profile according to risk analysis rules, which apply a level of risk to particular parameters and/or behaviors. For instance, an increased risk level may be applied to a short-term rental with an increased number of renters, and/or an increased risk level may be applied to a short-term rental in which a smoke alarm was triggered. The risk analysis rules may describe one more risk criteria to apply to records of certain behavior of property usage that cause an increase or decrease in risk level. The risk level of any and/or all parameters, behaviors, and/or other data available to risk level profile development module 306 may be aggregated and/or otherwise processed to develop the risk level profile. In this way, a change in one "aspect" or "element" of the risk level profile (e.g., the duration of the short-term rental) may cause a change in the risk level profile without necessarily affecting any other "aspects" of the risk level profile.

Property usage determination module 304 may output various metrics and/or indicators of usage of property 104, including behaviors of renters during a short-term thereat, to risk level profile development module 306 for use in developing a risk level profile associated with the short-term rental. For instance, property 104 may have a security system associated therewith. A security device may record when a security alarm is triggered and/or left deactivated during a short-term rental. A security device may additionally and/or alternatively detect when doors, windows, garage doors, and/or other points of entrance and/or egress are left open and/or unsecured.

Property usage determination module 304 may process property telematics devices records 322 from such a security device and may output an indicator of such high-risk behaviors (e.g., unsecured/open doors) to risk level profile development module 306. As another example, property 104 may include one or more "smart" smoke/fire detectors and/or sprinkler systems, which may record when they are triggered. Property usage determination module 304 may process property telematics devices records 322 from such smart devices and may output an indicator of the emergency trigger events to risk level profile development module 306. As another example, property 104 may include one more "smart" appliances and/or appliance-usage sensors configured to detect, track, and/or record usage of the appliance. Property usage determination module 304 may process property telematics devices records 322, including this usage data from the smart appliances, to determine whether an appliance was active/left on for an atypical/threshold period of time (e.g., a coffeepot left on for more than two hours, a stove left on for more than 1.5 hours, etc.).

Property usage determination module 304 may transmit an indication of such an event to risk level profile development module 306. Risk level profile development module 306 may increase a risk level associated with the short-term rental upon detection of any of these events (and/or additional or alternative events), as they indicate negligence and/or higher-risk behavior.

According to the developed risk level profile, adjusted coverage rate determination module 308 may calculate and/or otherwise determine (e.g., using a look-up table) an adjusted coverage rate 324 associated with the short-term rental (e.g., step 406 of process 400). In some embodiments, adjusted coverage rate determination module 308 may determine a single adjusted coverage rate 324 is associated with a single short-term rental. In other embodiments, adjusted coverage rate determination module 308 may determine an adjusted coverage rate 324 associated with an interval of time (e.g., a billing interval, such as a month). In these embodiments, risk level profile development module 306 may develop a risk level profile for each individual short-term rental occurring during the interval. Adjusted coverage rate determination module 308 may then determine an adjusted coverage "sub-rate" applicable to each short-term rental. Adjusted coverage rate determination module 308 may average, sum, and/or otherwise aggregate each adjusted coverage sub-rate into a "total" adjusted coverage rate 324 applicable to the entire interval.

Adjusted coverage rate determination module 308 may transmit a coverage report 326 including adjusted coverage rate 324 (e.g., as an email, push notification, text message, in-app message, etc.) to homeowner user computing device 110A (e.g., step 408 of process 400). The homeowner may accept or approve adjusted coverage rate 324. In some embodiments, the homeowner may be permitted to refuse or reject adjusted coverage rate 324 (which may leave the homeowner liable for any damage to property 104 during the short-term rental) and/or request changes to adjusted coverage rate 324.

Adjusted coverage rate determination module 308 may receive and/or retrieve insurance policy information 328 from insurance server 112. Insurance policy information 328 includes information associated with an insurance policy on property 104, including a baseline insurance coverage rate. In some embodiments, adjusted coverage rate determination module 308 may offer adjusted coverage rate 324 to the homeowner as an additional rate or fee on top of their baseline insurance coverage rate. In other words, adjusted coverage rate 324 may include a "surcharge" over the baseline insurance coverage rate, as a separate rate associated with one short-term rental and/or one interval of time. In this example, coverage report 326 may offer adjusted coverage rate 324 as follows: "You can be covered for this [short-term rental]/[interval] for only $XX. Would you like to add this coverage?" Alternatively adjusted coverage rate determination module 308 may offer an "adjusted baseline coverage rate," including the baseline cover rate that is increased according to the risk level profile. In this example, coverage report 326 may offer the adjusted (baseline) coverage rate as follows: "You can be covered for this [short-term rental]/[interval] by increasing your rate this month to $XX. Would you like to increase your current coverage?"

In some embodiments, adjusted coverage rate determination module 308 may offer a "preliminary" adjusted coverage rate to the homeowner, for instance, when a homeowner is just starting to offer property 104 for short-term rentals. The preliminary adjusted coverage rate may represent an estimated premium configured to cover "average" short-term rentals. The preliminary adjusted coverage rate may be applied (e.g., by insurance server 112) for one or more "preliminary intervals" (e.g., a first three months or a first six months), during which property usage determination module 304 determines an actual shared usage of property 104 (e.g., a number of short-term rentals, a percentage of time property 104 is shared/rented, an average/median/aggregated risk level profile of the short-term rentals, etc.), as described herein. Moreover, risk level profile development module 306 may develop an average risk level profile representing the average risk level of all short-term rentals that occurred at property 104 during the preliminary intervals. After the preliminary intervals, adjusted coverage rate determination module 308 may determine a long-term adjusted coverage rate 324 (which may be rather than, less, than, or equal to the preliminary adjusted coverage rate) and offer the long-term adjusted coverage rate 324 to the homeowner. The long-term adjusted coverage rate may be designed to cover the "average actual" short-term rental usage, and associated risk, at property 104. In this way, the homeowner may not need to accept/approve an adjusted coverage rate for each interval/each short-term rental. Such an embodiment may be preferable for homeowners that share their property 104 frequently and/or for a large percentage of each interval.

Additionally or alternatively, the homeowner may agree to pay the long-term adjusted coverage rate 324 each month (or other billing interval) but may be credited or debited any variation from the amount of the long-term adjusted coverage rate 324 if property 104 is rented more or less than usual or is otherwise associated with more/less risk. In these embodiments, property usage determination module 304 may substantially continuously (and/or on a per-interval basis) monitor rental usage of property 104. Property usage determination module 304 and/or risk level profile development module 306 may detect a threshold deviation in usage and/or risk level, and may prompt adjusted coverage rate determination module 308 to cause a credit or debit to be issued to the homeowner. Additionally or alternatively, property usage determination module 304 and/or risk level profile development module 306 may prompt adjusted coverage rate determination module 308 to determine an "updated" long-term coverage rate, which reflects a systematic shift in usage and/or risk in the short-term rentals at property 104.

In certain embodiments, a homeowner may only make their property 104 available for sharing during certain parts of the year. For instance, a homeowner may only share their summer home during non-summer months, when they are not present there. In these embodiments, the homeowner may notify insurance server 112 that no short-term rentals will be occurring for a specific period of time. Accordingly, insurance server 112 may revert their insurance rate back to a non-adjusted rate.

It should be understood that although the modules of renter analytics computing device 102 are described as performing various functions, other components of property-sharing system 100 may additionally and/or alternatively perform certain functions. For example, in some embodiments, risk level profile development module 306 may develop the risk level profile and transmit the risk level profile to insurance server 112. Insurance server 112 may then determine the adjusted coverage rate 324 and contact the homeowner to offer the adjusted coverage rate 324 (e.g., in a coverage report 326). Additionally or alternatively, adjusted coverage rate determination module 308 may still determine the adjusted coverage rate 324 but then may transmit adjusted coverage rate to 324 to insurance server 112 for review. If adjusted coverage rate 324 is approved by the insurance provider associated with insurance server 112, insurance server 112 may then transmit the adjusted coverage rate 324 (e.g., in a coverage report 326) to homeowner user computing device 110A. As another example, insurance server 112 may handle one or more steps of a claims generating and/or claims handling process, as described herein. Additionally or alternatively, renter analytics computing device 102 may be integral to insurance server 112, such that any functions described as performed using renter analytics computing device 102 and/or modules thereof may be performed by insurance server 112.

In the exemplary embodiment, property-sharing system 100 may be further configured to enable the homeowner to easily track and record a status of property 104 before and after each short term rental, by leveraging property telematics data 322 generated by property telematics devices 116 at property 104 (e.g., step 410 of process 400). For example, property telematics devices 116 may include or more cameras, one or more sensors (e.g., temperature sensors, water sensors, air quality sensors, etc.), and/or any other property telematics devices 116 configured to record and transmit property telematics data 322 associated with a status of property 104. In one embodiment, property profile management module 310 may receive and/or retrieve initial records or inputs from the property telematics devices 116 ("initial property telematics data" 330) associated with property 104 before a short-term rental (e.g., from property telematics controller 114). In some cases, the homeowner may additionally or alternatively submit initial property telematics data 330 to property profile management module 310.

Initial property telematics data 330 may include, for example, pictures, average temperature in certain spaces of property 104, an air quality level (e.g., no smoke), and/or other information recorded and/or transmitted by a property telematics device 116 and/or homeowner user computing device 110A. Property profile management module 310 may develop a baseline profile of property 104 based upon the initial property telematics data 330. In certain embodiments, property profile management module 310 may automatically initiate the capture of initial property telematics data 330 by the property telematics devices 116, for example, by transmitting an instruction thereto. For instance, property profile management module 310 may detect (e.g., based upon output from pre-rental record processing module 302) that a short-term rental start date is to occur within a particular threshold period of time (e.g., within one day).

Property profile management module 310 may transmit an instruction to property telematics controller 114 (and/or to one or more individual property telematics devices 116) that causes property telematics devices 116 to automatically record and transmit initial property telematics data 330. In this way, the homeowner need not even be present at property 104 for the baseline profile to be developed.

Property profile management module 310 may receive and/or retrieve one or more subsequent records or inputs from property telematics devices 116 ("subsequent property telematics data" 332) after a short-term rental. In some cases, the homeowner may additionally or alternatively submit subsequent property telematics data 332 to property profile management module 310. Subsequent property telematics data 332 may include, for example, pictures, average temperature in certain spaces of property 104, an air quality level (e.g., a level of smoke), and/or other information recorded and transmitted by a property telematics device 116 and/or homeowner user computing device 110A. Property profile management module 310 may develop a subsequent profile of property 104 based upon subsequent property telematics data 330.

In certain embodiments, property profile management module 310 may automatically initiate the capture of subsequent property telematics data 330 by the property telematics devices 116, for example, by transmitting an instruction thereto. For instance, property profile management module 310 may detect (e.g., based upon output from pre-rental record processing module 302) that a short-term rental end date has occurred within a particular threshold period of time (e.g., within one day). Property profile management module 310 may transmit an instruction to property telematics controller 114 (and/or to one or more individual property telematics devices 116) that causes property telematics devices 116 to automatically record and transmit subsequent property telematics data 330.

Property profile management module 310 may compare the subsequent profile to the baseline profile to determine whether any damage was incurred to property 104 during the short-term rental and, if so, a nature and/or extent of that damage. Property profile management module 310 may, in some embodiments, automatically generate an insurance claim 334 for any damage incurred. Insurance claim 334 may include a description and/or indication of a location, nature, and/or extent of the damage incurred. Property profile management module 310 may request approval from the homeowner before transmitting an automatically generated claim 334 to insurance server 112 for claims handling. In some embodiments, property profile management module 310 may automatically transmit claim 334 (e.g., with or without homeowner approval) to insurance server 112 for claims handling. Additionally or alternatively, property profile management module 310 may transmit a damage report (not shown) of the nature and extent of the damage to property 104 to insurance server 112. Insurance server 112 may then process the damage report and generate and/or handle a claim 334 internally.

Exemplary User Computer Device

Figure 5:
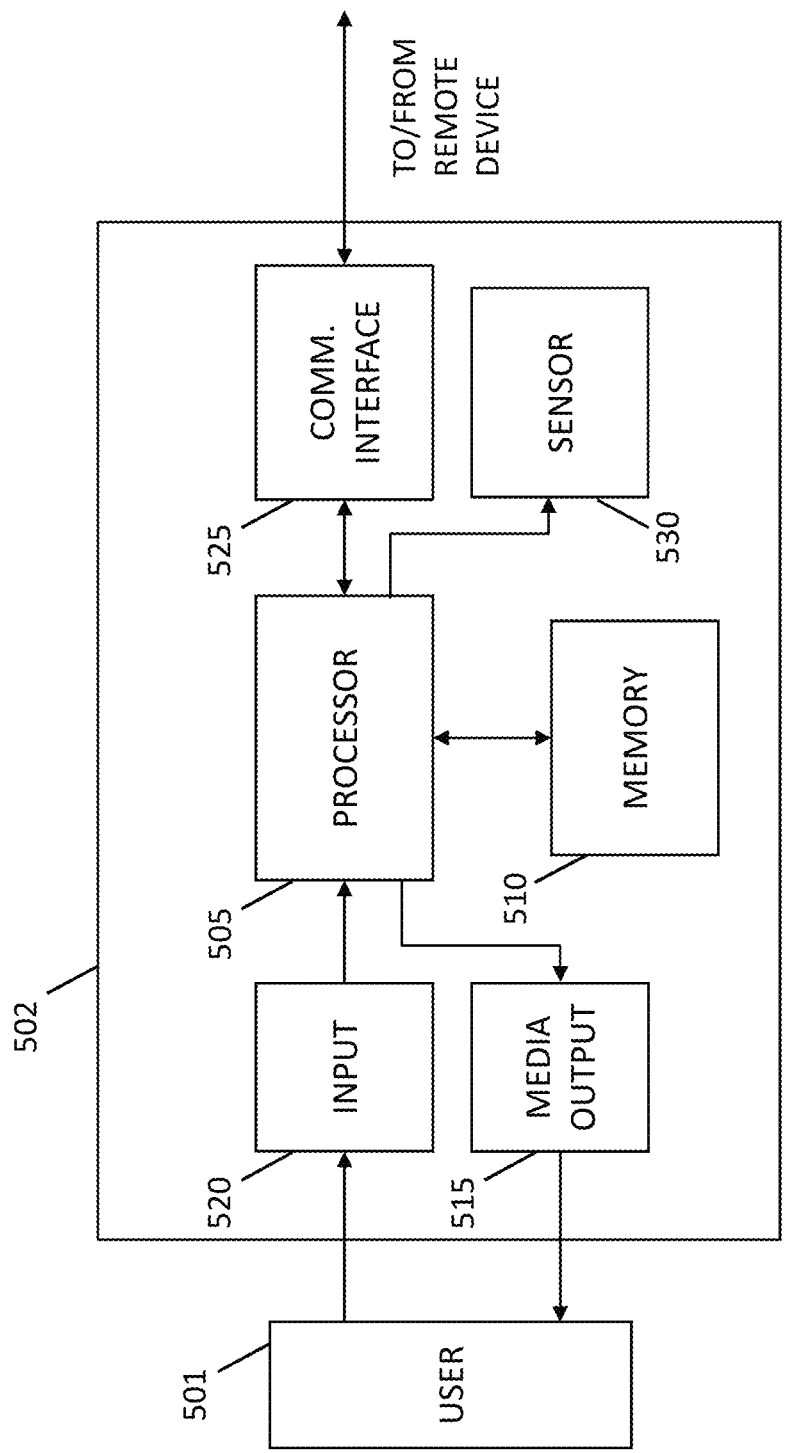
FIG. 5 illustrates an exemplary configuration of an exemplary user computing device shown in FIG. 1, in accordance with one embodiment of the present disclosure.

FIG. 5 depicts an exemplary configuration of an exemplary user computer device 502 that may be used with property-sharing system 100 (shown in FIG. 1), in accordance with one embodiment of the present disclosure. User computer device 502 may be operated by a user 501 (e.g., a homeowner and/or a renter). User computer device 502 may include, but is not limited to, user computing devices 110, property telematics controller, renter analytics computing device 102, and/or property telematics devices 116 (all shown in FIG. 1). User computer device 502 may include a processor 505 for executing instructions. In some embodiments, executable instructions may be stored in a memory area 510. Processor 505 may include one or more processing units (e.g., in a multi-core configuration). Memory area 510 may be any device allowing information such as executable instructions and/or transaction data to be stored and retrieved. Memory area 510 may include one or more computer-readable media.

User computer device 502 also may include at least one media output component 515 for presenting information to user 501. Media output component 515 may be any component capable of conveying information to user 501. In some embodiments, media output component 515 may include an output adapter (not shown), such as a video adapter and/or an audio adapter. An output adapter may be operatively coupled to processor 505 and operatively coupleable to an output device, such as a display device (e.g., a cathode ray tube (CRT), liquid crystal display (LCD), light emitting diode (LED) display, or "electronic ink" display) or an audio output device (e.g., a speaker or headphones).

In some embodiments, media output component 515 may be configured to present a graphical user interface (e.g., a web browser and/or a client application) to user 501. A graphical user interface may include, for example, an application for accessing a property telematics device 116, a property-sharing application, and/or an insurance provider application.

In some embodiments, user computer device 502 may include an input device 520 for receiving input from user 501. User 501 may use input device 520 to, without limitation, interact with property telematics controller 114 and/or renter analytics computing device 102 (e.g., using an app), input presence information, and/or request payment information. Input device 520 may include, for example, a keyboard, a pointing device, a mouse, a stylus, and/or a touch sensitive panel (e.g., a touch pad or a touch screen). A single component such as a touch screen may function as both an output device of media output component 515 and input device 520. User computer device 502 further includes at least one sensor 530, including, for example, a gyroscope, an accelerometer, a position detector, a biometric input device, and/or an audio input device.

User computer device 502 may also include a communication interface 525, communicatively coupled to a remote device such as renter analytics computing device 102 and/or property telematics controller 114. Communication interface 525 may include, for example, a wired or wireless network adapter and/or a wireless data transceiver for use with a mobile telecommunications network.

Stored in memory area 510 may be, for example, computer-readable instructions for providing a user interface to user 501 via media output component 515 and, optionally, receiving and processing input from input device 520. The user interface may include, among other possibilities, a web browser and/or a client application. Web browsers enable users, such as user 501, to display and interact with media and other information typically embedded on a web page or a website from renter analytics computing device 102, property telematics controller 114, insurance server 112, and/or a property-sharing application platform. A client application may allow user 501 to interact with, for example, computing device 102, property telematics controller 114, insurance server 112, and/or a property-sharing application platform. For example, instructions may be stored by a cloud service and the output of the execution of the instructions sent to the media output component 515.

Exemplary Server Device

Figure 6:
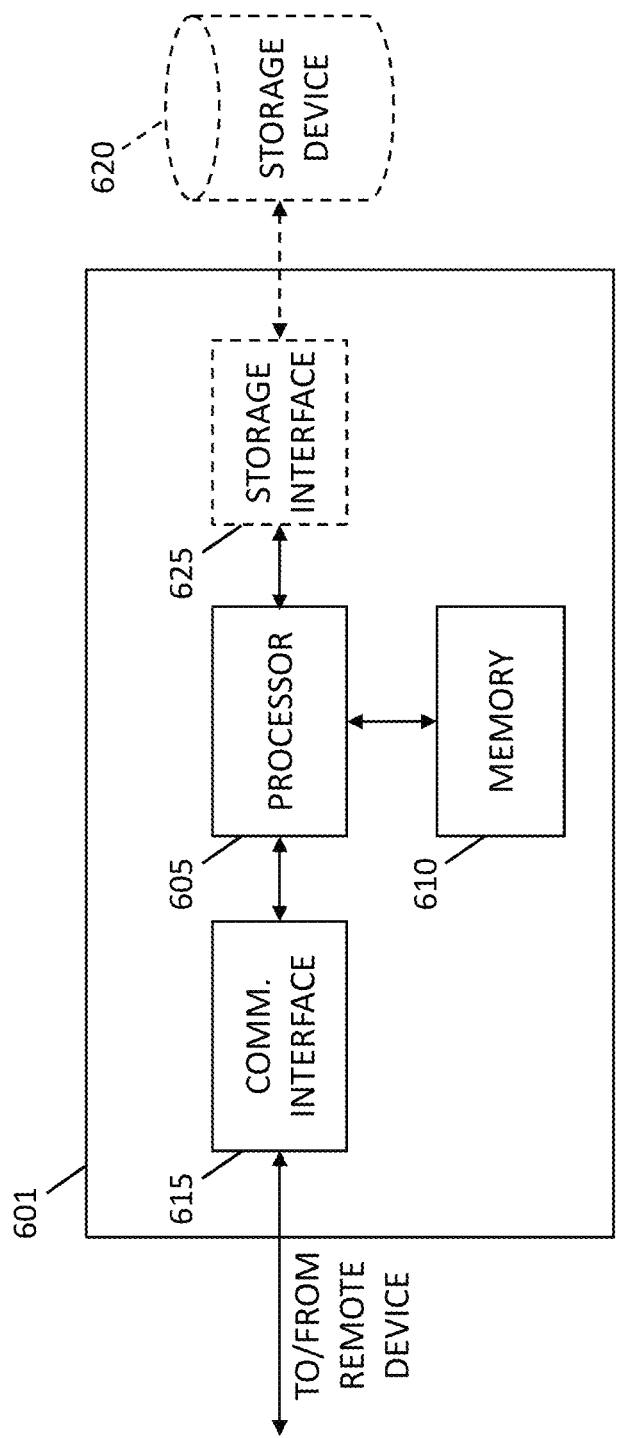
FIG. 6 illustrates an exemplary configuration of an exemplary server computer device shown in FIG. 1, in accordance with one embodiment of the present disclosure.

FIG. 6 depicts an exemplary configuration of an exemplary server computer device shown in FIG. 1, in accordance with one embodiment of the present disclosure. A server computer device 601 may include, but is not limited to, database server 106, renter analytics computing device 102, insurance server 112, and/or property telematics controller 114 (all shown in FIG. 1). Server computer device 601 may include a processor 605 for executing instructions. Instructions may be stored in a memory area 610. Processor 605 may include one or more processing units (e.g., in a multi-core configuration).

Processor 605 may be operatively coupled to a communication interface 615 such that server computer device 601 may be capable of communicating with a remote device such as another server computer device 601, user computer device 502 (shown in FIG. 5), or renter analytics computing device 102. For example, communication interface 615 may receive requests from or transmit requests to user computer device 502 via the Internet.

Processor 605 may also be operatively coupled to a storage device 620. Storage device 620 may be any computer-operated hardware suitable for storing and/or retrieving data, such as, but not limited to, data associated with memory device 108 (shown in FIG. 1). In some embodiments, storage device 620 may be integrated in server computer device 601. For example, server computer device 601 may include one or more hard disk drives as storage device 620.

In other embodiments, storage device 620 may be external to server computer device 601 and may be accessed by a plurality of server computer devices 601. For example, storage device 620 may include a storage area network (SAN), a network attached storage (NAS) system, and/or multiple storage units such as hard disks and/or solid state disks in a redundant array of inexpensive disks (RAID) configuration.

In some embodiments, processor 605 may be operatively coupled to storage device 620 via a storage interface 625. Storage interface 625 may be any component capable of providing processor 605 with access to storage device 620. Storage interface 625 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 620.

Processor 605 executes computer-executable instructions for implementing aspects of the disclosure. In some embodiments, processor 605 may be transformed into a special purpose microprocessor by executing computer-executable instructions or by otherwise being programmed. For example, processor 605 may be programmed with the instructions such as are illustrated in FIG. 4 and/or in FIG. 7.

Figure 7:
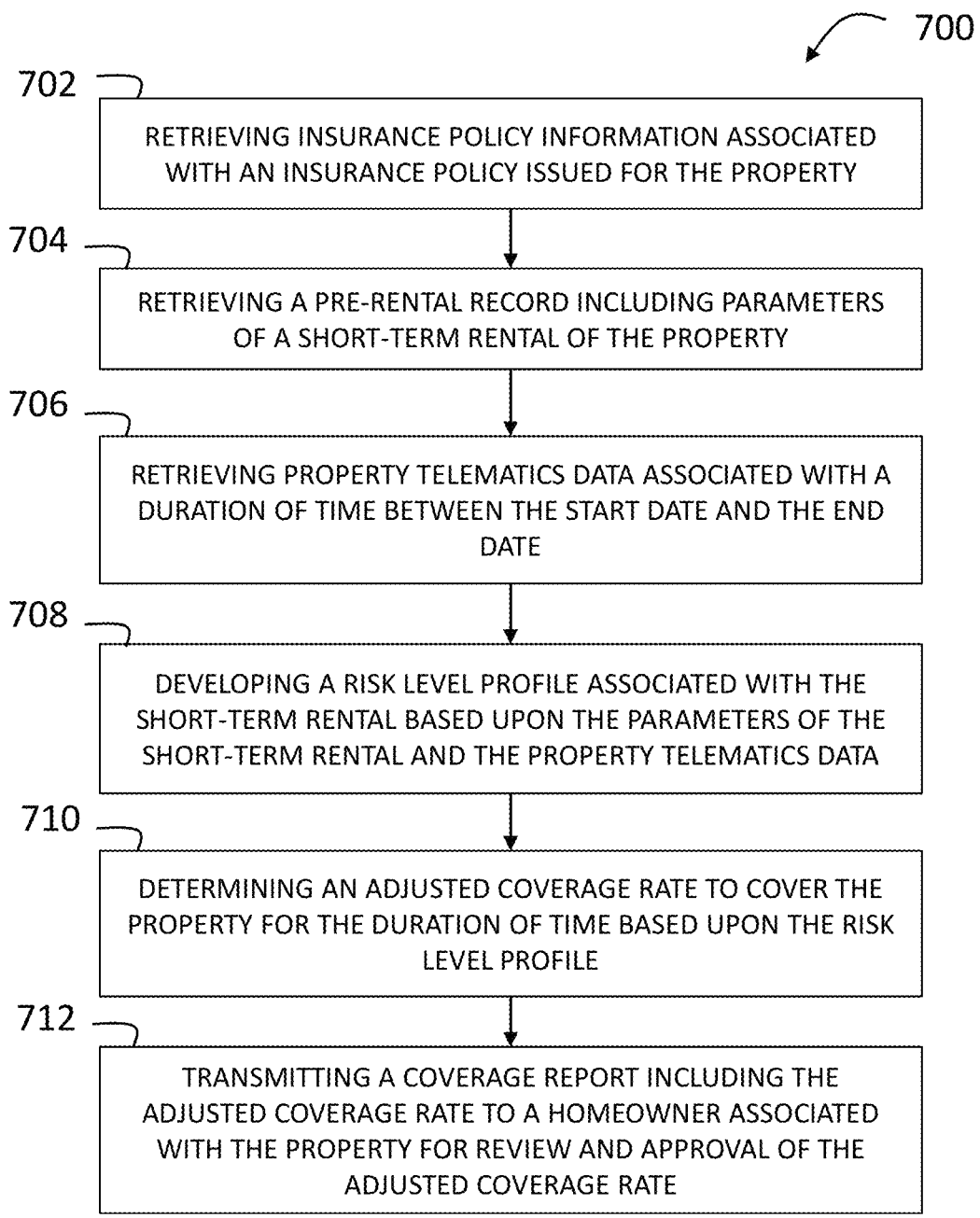
FIG. 7 illustrates a flow chart of an exemplary computer-implemented method for analyzing property telematics data to update risk-based coverage of a property, using the property-sharing system shown in FIG. 1.

Exemplary Method for Analyzing Property Telematics Data to Update Risk-Based Coverage of a Property FIG. 7 depicts a flow chart of an exemplary computer-implemented method 700 for analyzing property telematics data to update risk-based coverage of a property (e.g., property 104, shown in FIG. 1) using property-sharing system 100 shown in FIG. 1. In the exemplary embodiment, steps of method 700 may be performed by at least one of renter analytics computing device 102, property telematics controller 114, and/or insurance server 112.

Method 700 may include, with homeowner permission or affirmative consent, retrieving 702 insurance policy information associated with an insurance policy issued for the property, such as via wireless communication or data transmission over one or more radio links or wireless communication channels. The insurance policy information may include a baseline coverage rate. Method 700 may also include retrieving 704 a pre-rental record including parameters of a short-term rental of the property, such as via wireless communication or data transmission over one or more radio links or wireless communication channels. The parameters may include an anticipated number of renters, a start date, an end date, and an indicator of shared space. Method 700 may further include retrieving 706 property telematics data associated with a duration of time between the start date and the end date, such as via wireless communication or data transmission over one or more radio links or wireless communication channels. The property telematics data may be generated by one or more property telematics devices (and/or smart devices) associated with the property, and the property telematics data may be indicative of actual usage of the property during the short-term rental Method 700 may also include developing 708 a risk level profile associated with the short-term rental based upon the parameters of the short-term rental and the property telematics data. Method 700 may still further include determining 710 an adjusted coverage rate to cover the property for the duration of time (e.g., the duration of the short-term rental) based upon the risk level profile. The adjusted coverage rate may be independent of the baseline coverage rate. Method 700 may also include transmitting 712 a coverage report including the adjusted coverage rate to a homeowner associated with the property for review and approval of the adjusted coverage rate It should be understood that method 700 may include fewer, additional, and/or alternative steps for allocating property costs between users of a shared property. For example, in some embodiments, method 700 may include at least one of: (i) processing the property telematics data to determine various characteristics of the short-term rental; (ii) retrieving initial property telematics data before the start date of the short-term rental; (iii) developing a baseline profile of the property based upon the initial property telematics data; (iv) retrieving subsequent property telematics data after the end date of the short-term rental; (v) developing a subsequent profile of the property based upon the subsequent property telematics data; (vi) comparing the subsequent profile to the baseline profile to determine a nature and extent of any damage incurred to the property during the short-term rental; (vii) generating an insurance claim associated with the damage incurred to the property, the insurance claim describing the nature and extent of the damage; and/or (viii) transmitting the insurance claim to an insurance server associated with the insurance policy on the property.

Figure 8:
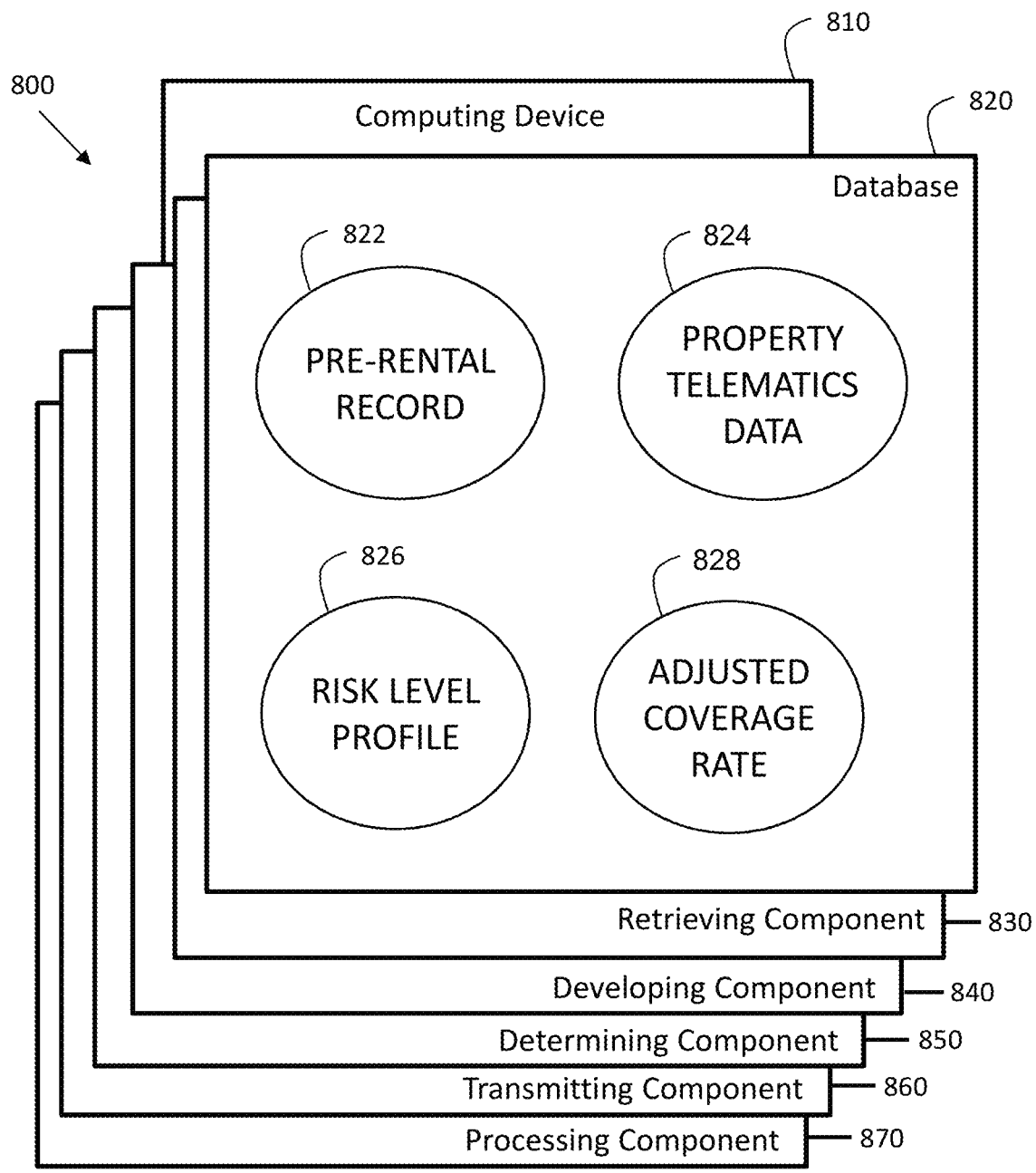
FIG. 8 illustrates a diagram of components of one or more exemplary computing devices that may be used in the property-sharing system shown in FIG. 1.

Exemplary Computer for Analyzing Property Telematics Data to Update Risk-Based Coverage of a Property FIG. 8 depicts a diagram 800 of components of one or more exemplary computing devices 810 that may be used in property-sharing system 100 shown in FIG. 1. In some embodiments, computing device 810 may be similar to renter analytics computing device 102, insurance server 112, and/or property telematics controller 114 (all shown in FIG. 1). In the exemplary embodiment, computing device 810 may include a database 820, which may be similar to memory device 108 (also shown in FIG. 1). Database 820 may include pre-rental records 822, property telematics data 824, risk level profiles 826, and adjusted coverage rates 828. Database 820 may be coupled with several separate components within computing device 810, which perform specific tasks.

In one exemplary embodiment, computing device 810 may include a retrieving component 830. In some embodiments, retrieving component 830 may include and/or be integral to any kind of communication device (e.g., a transceiver). Retrieving component 830 may be configured to retrieve insurance policy information associated with an insurance policy issued for a property (e.g., property 104, shown in FIG. 1). The insurance policy information may include a baseline coverage rate. Retrieving component 830 may also be configured to retrieve a pre-rental record 822 including parameters of a short-term rental of the property. The parameters may include an anticipated number of renters, a start date, an end date, and an indicator of shared space. Retrieving component 830 may be further configured to retrieve property telematics data 824 associated with a duration of time between the start date and the end date. The property telematics data 824 may be generated by one or more property telematics devices (e.g., property telematics devices 116, shown in FIG. 1) associated with the property, and the property telematics data 824 may be indicative of actual usage of the property during the short-term rental.

Computing device 810 may further include a developing component 840 configured to develop a risk level profile 826 associated with the short-term rental based upon the parameters of the short-term rental and the property telematics data 824. Computing device 810 may also include a determining component 850, wherein determining component 850 may be configured to determine an adjusted coverage rate 828 to cover the property for the duration of time based upon the risk level profile 826. The adjusted coverage rate 828 may be independent of the baseline coverage rate.

In addition, computing device 810 may include a transmitting component 860, configured to transmit a coverage report including the adjusted coverage rate 828 to a homeowner associated with the property for review and approval of the adjusted coverage rate 828. In some embodiments, transmitting component 860 may include and/or be integral to any kind of communication device (e.g., a transceiver). Additionally, a processing component 870 may assist with execution of computer-executable instructions associated with the system.

Additional Exemplary Embodiments and Methods

Additional embodiments and methods are contemplated, including those described herein. In one aspect, a renter analytics computing device for updating risk-based coverage of a property for a short-term rental may be provided. The renter analytics computing device may be configured to retrieve a pre-rental record including parameters of a short-term rental of the property. The parameters may include an anticipated number of renters, a start date, an end date, and an indicator of shared space. The renter analytics computing device may also be configured to develop an initial risk level profile associated with the short-term rental based upon the parameters of the short-term rental, and implement, upon approval from a homeowner associated with the property, a preliminary adjusted coverage rate to cover the property for the duration of time based upon the initial risk level profile. The renter analytics computing device may be further configured to retrieve property telematics data associated with a duration of time between the start date and the end date, wherein the property telematics data is generated by one or more property telematics devices associated with the property. The property telematics data may be indicative of actual usage of the property during the short-term rental. The renter analytics computing device may be configured to update the initial risk level profile to an actual risk level profile based upon the property telematics data, and issue at least one of a credit and a debit to the homeowner based upon the actual risk level profile and the preliminary adjusted coverage rate.

The renter analytics computing device may have additional, less, and/or alternative functionality. For example, the renter analytics computing device may be configured to: (i) process the property telematics data to determine various characteristics of the short-term rental, (ii) issue the credit when the actual risk level profile indicates a lower risk level than the initial risk level profile, and/or (iii) issue the debit when the actual risk level profile indicates a higher risk level than the initial risk level profile.

In another aspect, a computer-implemented method for updating risk-based coverage of a property for a short-term rental, and/or improving the functioning of a computer, may be provided. The method may be implemented using a renter analytics computing device. The method may include retrieving a pre-rental record including parameters of a short-term rental of the property, the parameters including an anticipated number of renters, a start date, an end date, and an indicator of shared space. The method may also include developing an initial risk level profile associated with the short-term rental based upon the parameters of the short-term rental, and implementing, upon approval from a homeowner associated with the property, a preliminary adjusted coverage rate to cover the property for the duration of time based upon the initial risk level profile. The method may further include retrieving property telematics data associated with a duration of time between the start date and the end date, wherein the property telematics data is generated by one or more property telematics devices associated with the property. The property telematics data may be indicative of actual usage of the property during the short-term rental. The method may also include updating the initial risk level profile to an actual risk level profile based upon the property telematics data, and issuing at least one of a credit and a debit to the homeowner based upon the actual risk level profile and the preliminary adjusted coverage rate.

The method may include additional, less, and/or alternative steps. For example, the method may include (i) processing the property telematics data to determine various characteristics of the short-term rental, (ii) issuing the credit when the actual risk level profile indicates a lower risk level than the initial risk level profile, and/or issuing the debit when the actual risk level profile indicates a higher risk level than the initial risk level profile.

In a further aspect, a renter analytics computing device for analyzing property telematics data to update risk-based coverage of a property may be provided. The renter analytics computing device may be configured to retrieve insurance policy information associated with an insurance policy issued for the property, the insurance policy information including a baseline coverage rate. The renter analytics computing device may also be configured to, upon receiving a notification from a homeowner associated with the property that the property is available for short-term rentals, implement a preliminary adjusted coverage rate for a plurality of preliminary intervals. The renter analytics computing device may be further configured to retrieve a plurality of pre-rental records including parameters of a corresponding plurality of short-term rentals of the property during the plurality of preliminary intervals, and retrieve property telematics data associated with the plurality of short-term rentals, wherein the property telematics data is generated by one or more property telematics devices associated with the property. The property telematics data may be indicative of actual usage of the property during the plurality of short-term rentals. The renter analytics computing device may also be configured to develop an average risk level profile of the plurality of short-term rentals based upon the parameters of the plurality of short-term rentals and the property telematics data, the average risk level profile indicating an average level of risk presented by the plurality of short-term rentals. The renter analytics computing device may be still further configured to determine a long-term adjusted coverage rate based upon the average risk level profile, and transmit a coverage report including the long-term adjusted coverage rate to a homeowner associated with the property for review and approval of the long-term adjusted coverage rate The renter analytics computing device may have additional, less, and/or alternative functionality. For example, the renter analytics computing device may be configured to: (i) retrieve a subsequent plurality of pre-rental records including parameters of a corresponding subsequent plurality of short-term rentals of the property during a subsequent interval, (ii) retrieve subsequent property telematics data associated with the subsequent plurality of short-term rentals, (iii) determine whether to update the average risk level profile based upon the parameters of the subsequent plurality of short-term rentals and the subsequent property telematics data, (iv) when the average risk level profile is update, update the long-term adjusted coverage rate to an updated long-term coverage rate, and/or (v) transmit a subsequent coverage reporting including the updated long-term coverage rate to the homeowner for review and approval.

In yet another aspect, a computer-implemented method for analyzing property telematics data to update risk-based coverage of a property, and/or improving the functioning of a computer, may be provided. The method may be implemented using a renter analytics computing device. The method may include retrieving insurance policy information associated with an insurance policy issued for the property, the insurance policy information including a baseline coverage rate. The method may also include, upon receiving a notification from a homeowner associated with the property that the property is available for short-term rentals, implementing a preliminary adjusted coverage rate for a plurality of preliminary intervals. The method may further include retrieving a plurality of pre-rental records including parameters of a corresponding plurality of short-term rentals of the property during the plurality of preliminary intervals, and retrieving property telematics data associated with the plurality of short-term rentals, wherein the property telematics data is generated by one or more property telematics devices associated with the property. The property telematics data may be indicative of actual usage of the property during the plurality of short-term rentals. The method may also include developing an average risk level profile of the plurality of short-term rentals based upon the parameters of the plurality of short-term rentals and the property telematics data, the average risk level profile indicating an average level of risk presented by the plurality of short-term rentals. The method may still further include determining a long-term adjusted coverage rate based upon the average risk level profile, and/or transmitting a coverage report including the long-term adjusted coverage rate to a homeowner associated with the property for review and approval of the long-term adjusted coverage rate.

The method may include additional, less, and/or alternative steps. For example, the method may include (i) retrieving a subsequent plurality of pre-rental records including parameters of a corresponding subsequent plurality of short-term rentals of the property during a subsequent interval, (ii) retrieving subsequent property telematics data associated with the subsequent plurality of short-term rentals, (iii) determining whether to update the average risk level profile based upon the parameters of the subsequent plurality of short-term rentals and the subsequent property telematics data, (iv) when the average risk level profile is update, updating the long-term adjusted coverage rate to an updated long-term coverage rate, and/or (v) transmitting a subsequent coverage reporting including the updated long-term coverage rate to the homeowner for review and approval.

The foregoing embodiments and methods may include additional, less, or alternate functionality, including that discussed elsewhere herein. The foregoing methods may be implemented via one or more local or remote processors, sensors, transceivers, and/or servers, and/or via computer-executable instructions stored on non-transitory computer-readable media or medium.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and proceeded with the word "a" or "an" should be understood as not excluding plural elements or steps, unless such exclusion is explicitly recited. Furthermore, references to "exemplary embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A computing system for updating records associated with usage of a property for a short-term period of time, the computing system comprising:
   one or more property telematics devices for monitoring utility usage at the property, the one or more property telematics devices comprising one or more utility usage sensors and one or more light-based sensors in communication with a property telematics controller, the one or more property telematics devices configured to:
      generate property telematics data for the property, the property telematics data indicative of actual usage of the property during the short-term period of time; and
      in response to receiving, by the property telematics controller, a computer instruction from an analytics computing device, prepare to transmit the property telematics data to the analytics computing device via the property telematics controller; and
   the analytics computing device comprising at least one memory and at least one processor, wherein the at least one processor is configured to:
      receive, from the property telematics controller, the property telematics data collected by the one or more property telematics devices including utility usage data collected for the property during the short-term period of time;
      store, within the at least one memory, an actual profile of the property based upon the property telematics data collected for the property during the short-term period of time;
      compare a baseline profile stored within the at least one memory to the actual profile to generate a differential profile showing a difference in the utility usage data for the property during the short-term period of time, wherein the baseline profile represents an expected usage of the property during the short-term period of time including an expected utility usage; and
      transmit, to a homeowner associated with the property, (i) the differential profile showing the difference between the expected utility usage and an actual utility usage for the property during the short-term period of time, and (ii) a preliminary adjusted coverage rate to cover the property between a start date and an end date of the short-term period of time.

2. The computing system of claim 1, wherein the at least one processor is further configured to retrieve, from the at least one memory, a data record including parameters associated with the short-term period of time, the parameters including the start date and the end date, an anticipated number of occupants of the property, and a subset of the property telematics data further include an actual number of occupants associated with the short-term period of time.

3. The computing system of claim 2, wherein the at least one processor is further configured to:
   develop the baseline profile of the property and associated with the short-term period of time based upon the parameters; and
   store the baseline profile within the at least one memory.

4. The computing system of claim 2, wherein the data record is generated using a property-sharing application platform.

5. The computing system of claim 1, wherein the at least one processor is further configured to transmit the computer instruction to the property telematics controller, the computer instruction causing the property telematics controller to instruct the one or more property telematics devices to prepare to transmit the property telematics data to the analytics computing device.

6. The computing system of claim 1, wherein the at least one processor is further configured to:
   retrieve a subset of the property telematics data associated with a duration of time between the start date and the end date; and
   update, within the at least one memory, the baseline profile to the actual profile using the subset of the property telematics data.

7. The computing system of claim 1, wherein the at least one processor is further configured to implement, upon approval from the homeowner associated with the property, the preliminary adjusted coverage rate.

8. A computer-implemented method for updating records associated with usage of a property for a short-term period of time, the method implemented using a computing system including one or more property telematics devices and an analytics computing device including at least one processor in communication with at least one memory, the one or more property telematics devices including one or more utility usage sensors and one or more light-based sensors in communication with a property telematics controller, the method comprising:
   generating, by the one or more property telematics devices, property telematics data for the property, the property telematics data indicative of actual usage of the property during the short-term period of time;
   in response to receiving, by the property telematics controller, a computer instruction from the analytics computing device, preparing to transmit, by the one or more property telematics devices, the property telematics data to the analytics computing device via the property telematics controller;

receiving, by the analytics computing device from the property telematics controller, the property telematics data collected by the one or more property telematics devices including utility usage data collected for the property during the short-term period of time;

storing, by the analytics computing device within the at least one memory, an actual profile of the property based upon the property telematics data collected for the property during the short-term period of time;

comparing, by the analytics computing device, a baseline profile stored within the at least one memory to the actual profile to generate a differential profile showing a difference in the utility usage data for the property during the short-term period of time, wherein the baseline profile represents an expected usage of the property during the short-term period of time including an expected utility usage; and transmitting, by the analytics computing device to a homeowner associated with the property, (i) the differential profile showing the difference between the expected utility usage and an actual utility usage for the property during the short-term period of time, and (ii) a preliminary adjusted coverage rate to cover the property between a start date and an end date of the short-term period of time.

9. The computer-implemented method of claim 8 further comprising retrieving, by the analytics computing device from the at least one memory, a data record including parameters associated with the short-term period of time, the parameters including the start date and the end date, an anticipated number of occupants of the property, and a subset of the property telematics data further include an actual number of occupants associated with the short-term period of time.

10. The computer-implemented method of claim 9 further comprising:
developing, by the analytics computing device, the baseline profile of the property and associated with the short-term period of time based upon the parameters; and
storing, by the analytics computing device, the baseline profile within the at least one memory.

11. The computer-implemented method of claim 9, wherein the data record is generated using a property-sharing application platform.

12. The computer-implemented method of claim 8 further comprising transmitting, by the analytics computing device, the computer instruction to the property telematics controller, the computer instruction causing the property telematics controller to instruct the one or more property telematics devices to prepare to transmit the property telematics data to the analytics computing device.

13. The computer-implemented method of claim 8 further comprising:
retrieving, by the analytics computing device, a subset of the property telematics data associated with a duration of time between the start date and the end date; and
updating, by the analytics computing device within the at least one memory, the baseline profile to the actual profile using the subset of the property telematics data.

14. The computer-implemented method of claim 8 further comprising implementing, by the analytics computing device upon approval from the homeowner associated with the property, the preliminary adjusted coverage rate.

15. At least one first non-transitory computer-readable storage medium having first computer-executable instructions embodied thereon, wherein when executed by one or more property telematics devices for monitoring utility usage at a property, the one or more property telematics devices including one or more utility usage sensors and one or more light-based sensors in communication with a property telematics controller, the first computer-executable instructions cause the one or more property telematics devices to:
generate property telematics data for the property, the property telematics data indicative of actual usage of the property during a short-term period of time; and
in response to receiving, by the property telematics controller, a computer instruction from an analytics computing device, prepare to transmit the property telematics data to the analytics computing device via the property telematics controller; and at least one second non-transitory computer-readable storage medium having second computer-executable instructions embodied thereon, wherein when executed by at least one processor in communication with at least one memory, the second computer-executable instructions cause the at least one processor to:
receive, from the property telematics controller, the property telematics data collected by the one or more property telematics devices including utility usage data collected for the property during the short-term period of time;
store, within the at least one memory, an actual profile of the property based upon the property telematics data collected for the property during the short-term period of time;
compare a baseline profile stored within the at least one memory to the actual profile to generate a differential profile showing a difference in the utility usage data for the property during the short-term period of time, wherein the baseline profile represents an expected usage of the property during the short-term period of time including an expected utility usage; and
transmit, to a homeowner associated with the property, (i) the differential profile showing the difference between the expected utility usage and an actual utility usage for the property during the short-term period of time, and (ii) a preliminary adjusted coverage rate to cover the property between a start date and an end date of the short-term period of time.

16. The at least one second non-transitory computer-readable storage medium of claim 15, wherein the second computer-executable instructions cause the at least one processor to retrieve, from the at least one memory, a data record including parameters associated with the short-term period of time, the parameters including the start date and the end date, an anticipated number of occupants of the property, and a subset of the property telematics data further include an actual number of occupants associated with the short-term period of time.

17. The at least one second non-transitory computer-readable storage medium of claim 16, wherein the second computer-executable instructions cause the at least one processor to:
develop the baseline profile of the property and associated with the short-term period of time based upon the parameters; and
store the baseline profile within the at least one memory.

18. The at least one second non-transitory computer-readable storage medium of claim 15, wherein the second computer-executable instructions cause the at least one processor to transmit the computer instruction to the property telematics controller, the computer instruction causing the property telematics controller to instruct the one or more property telematics devices to prepare to transmit the property telematics data to the analytics computing device.

19. The at least one second non-transitory computer-readable storage medium of claim 15, wherein the second computer-executable instructions cause the at least one processor to:
   retrieve a subset of the property telematics data associated with a duration of time between the start date and the end date; and
   update, within the at least one memory, the baseline profile to the actual profile using the subset of the property telematics data.

20. The at least one second non-transitory computer-readable storage medium of claim 15, wherein the second computer-executable instructions cause the at least one processor to implement, upon approval from the homeowner associated with the property, the preliminary adjusted coverage rate.

* * * * *